United States Patent
Colombo et al.

(10) Patent No.: US 12,449,561 B2
(45) Date of Patent: Oct. 21, 2025

(54) PHYSICS-DRIVEN DEEP LEARNING INVERSION COUPLED TO FLUID FLOW SIMULATORS

(71) Applicant: SAUDI ARABIAN OIL COMPANY, Dhahran (SA)

(72) Inventors: Daniele Colombo, Dhahran (SA); Weichang Li, Katy, TX (US); Ernesto Sandoval-Curiel, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 730 days.

(21) Appl. No.: 17/121,042

(22) Filed: Dec. 14, 2020

(65) Prior Publication Data
US 2022/0187492 A1 Jun. 16, 2022

(51) Int. Cl.
*G01V 1/30* (2006.01)
*G01V 3/18* (2006.01)
(Continued)

(52) U.S. Cl.
CPC ............ *G01V 9/007* (2013.01); *G01V 1/30* (2013.01); *G01V 3/18* (2013.01); *G01V 11/00* (2013.01);
(Continued)

(58) Field of Classification Search
CPC ...... G01V 9/007; G01V 99/005; G01V 20/00; G01V 2210/61; G01V 2210/6169;
(Continued)

(56) References Cited

U.S. PATENT DOCUMENTS

| 8,363,509 B2 | 1/2013 | Colombo et al. |
| 8,861,308 B2 | 10/2014 | Virgilio et al. |
| (Continued) | | |

FOREIGN PATENT DOCUMENTS

| EP | 2020609 A1 | 2/2009 | |
| WO | WO-2020146863 A1 * | 7/2020 | ............ G01V 1/30 |

OTHER PUBLICATIONS

Colombo D. et al., "High-resolution velocity modeling by seismic-airborne TEM joint inversion: a new perspective for hear surface characterization", The Leading Edge, vol. 35, Nov. 2016, pp. 977-985 (9 pages).
(Continued)

*Primary Examiner* — John E Johansen
(74) *Attorney, Agent, or Firm* — Osha Bergman Watanabe & Burton LLP

(57) ABSTRACT

A method for a physics-driven deep learning-based inversion coupled to fluid flow simulators may include obtaining measured data for a subsurface region, obtaining prior subsurface data for the subsurface region, and obtaining a physics-driven standard regularized joint inversion for at least two model parameters. The method may further include obtaining a case-based deep learning inversion characterized by a contracting path and an expansive path. The method may further include forming the physics-driven deep learning inversion with the physics-driven standard regularized joint inversion, the case-based deep learning inversion, and a coupling operator based on a penalty function. The method may further include forming a feedback loop between the physics-driven standard regularized joint inversion and the case-based deep learning inversion for re-training the case-based deep learning inversion. The method may further include generating an inversion solution for reservoir monitoring.

20 Claims, 16 Drawing Sheets

(51) Int. Cl.
  *G01V 9/00*   (2006.01)
  *G01V 11/00*  (2006.01)
  *G01V 20/00*  (2024.01)
  *G06F 30/23*  (2020.01)
  *G06F 30/27*  (2020.01)
  *G06F 30/28*  (2020.01)
  *G06N 3/04*   (2023.01)
  *G06N 3/045*  (2023.01)
  *G06N 3/08*   (2023.01)
  *G01V 99/00*  (2024.01)

(52) U.S. Cl.
  CPC .............. *G01V 20/00* (2024.01); *G06F 30/23* (2020.01); *G06F 30/27* (2020.01); *G06F 30/28* (2020.01); *G06N 3/04* (2013.01); *G06N 3/045* (2023.01); *G06N 3/08* (2013.01); *G01V 99/00* (2013.01); *G01V 2210/61* (2013.01); *G01V 2210/6169* (2013.01)

(58) Field of Classification Search
  CPC . G01V 1/30; G01V 3/18; G01V 11/00; G01V 99/00; G06F 30/23; G06F 30/28; G06F 30/27; G06N 3/04; G06N 3/045; G06N 3/08
  USPC .......................................................... 703/10
  See application file for complete search history.

(56) References Cited

U.S. PATENT DOCUMENTS

| | | | |
|---|---|---|---|
| 10,261,215 B2 | 4/2019 | Miotti et al. | |
| 2002/0099504 A1 | 7/2002 | Cross et al. | |
| 2011/0264421 A1 | 10/2011 | Jing et al. | |
| 2013/0118808 A1* | 5/2013 | Yang ................. | E21B 44/02 175/24 |
| 2013/0179130 A1* | 7/2013 | Zhandov ............ | G06F 30/00 703/2 |
| 2014/0310071 A1 | 10/2014 | Conradson et al. | |
| 2016/0086079 A1 | 3/2016 | De Stefano | |
| 2017/0300911 A1* | 10/2017 | Alnajem ........... | G06Q 20/4014 |
| 2019/0195067 A1* | 6/2019 | Colombo ........... | E21B 49/00 |
| 2019/0383965 A1 | 12/2019 | Salman et al. | |
| 2020/0088896 A1 | 3/2020 | Schmedes et al. | |
| 2020/0096663 A1* | 3/2020 | Shetty .............. | G01V 1/50 |
| 2020/0183031 A1 | 6/2020 | Denli et al. | |
| 2020/0183041 A1* | 6/2020 | Denli ................ | G01V 20/00 |

OTHER PUBLICATIONS

Colombo, D. and M. De Stefano, "Geophysical modeling via simultaneous joint inversion of seismic, gravity, and electromagnetic data: Application to prestack depth imaging", The Leading Edge, vol. 26, Mar. 2007, pp. 326-331 (6 pages).

Ronneberger, O. et al., "U-net: Convolutional Networks for Biomedical Image Segmentation", May 2015, pp. 1-8, URL: https://arxiv.org/abs/1505.04597v1> (8 pages).

Rovetta, Diego and Daniele Colombo, "Analysis of inter-domain coupling constraints for multi-physics joint inversion", Inverse Problems, IOP Publishing Ltd., vol. 34, Nov. 2018, pp. 1-31 (31 pages).

Naeini, Ehsan Zabihi, "A machine learning approach to quantitative interpretation", SEG International Exposition and 89th Annual Meeting, SEG, 2019, pp. 3176-3180 (5 pages).

International Search Report and Written Opinion of the International Searching Authority issued in corresponding International Application No. PCT/US2021/018753, mailed on Aug. 11, 2021 (20 pages).

Colombo, Daniele et al., "Physics-driven deep learning joint inversion", SEG Technical Program Expanded Abstracts 2020, pp. 1775-1779, Sep. 30, 2020 (8 pages).

Moorkamp, Max et al., "Joint Inversion in Hydrocarbon Exploration: Theory and Applications", In: "Integrated Imaging of the Earth: Theory and Applications", John Wiley & Sons, Inc, vol. 218, pp. 167-189, Apr. 22, 2016 (23 pages).

International Search Report and Written Opinion of the International Searching Authority issued in corresponding International Application No. PCT/US2021/063305, mailed Mar. 21, 2022 (17 pages).

Biswas, Reetam et al., "Prestack and poststack inversion using a physics-guided convolutional neural network", Interpretation, Society of Exploration Geophysicists and American Association of Petroleum Geologists, vol. 7, No. 3, Aug. 2019, pp. SE161-SA174 (14 pages).

Colombo, Daniele et al., "Deep-learning electromagnetic monitoring coupled to fluid flow simulators", Geophysics, Society of Exploration Geophysicists, vol. 85, No. 4, Jul.-Aug. 2020, pp. WA1-WA12 (12 pages).

Dogru, Ali H. et al., "A Next-Generation Parallel Reservoir Simulator for Giant Reservoirs", SPE 119272, Society of Petroleum Engineers, Feb. 2009, pp. 1-29 (29 pages).

Archie, G.E., "The Electrical Resistivity Log as an Aid in Determining Some Reservoir Characteristics", T.P. 1422, Petroleum Technology, Jan. 1942, pp. 54-62 (9 pages).

Non-Final Office Action issued by U.S. Patent Office for corresponding U.S. Appl. No. 17/121,044, mailed Jul. 18, 2024 (18 pages).

Final Office Action issued by the U.S. Patent Office for corresponding U.S. Appl. No. 17/121,044, mailed Mar. 27, 2025 (22 pages).

\* cited by examiner

PHYSICS-DRIVEN DEEP LEARNING INVERSION COUPLED TO FLUID FLOW SIMULATORS

BACKGROUND

Reservoir monitoring is an operation involving the mapping of fluid movements within the reservoir as a consequence of oil production. The capabilities of mapping and monitoring the evolution of the saturations in the reservoir by estimating the saturations away from the well (i.e., in the interwell space) provide better knowledge of where to drill new wells to drain the oil in the reservoir, or, in other words, to optimize field development.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for a physics-driven deep learning-based inversion coupled to fluid flow simulators may include obtaining measured data for a subsurface region, obtaining prior subsurface data for the subsurface region, and obtaining a physics-driven standard regularized joint inversion for at least two model parameters. The method may further include obtaining a case-based deep learning inversion characterized by a contracting path and an expansive path. The method may further include forming the physics-driven deep learning inversion with the physics-driven standard regularized joint inversion, the case-based deep learning inversion, and a coupling operator based on a penalty function. The method may further include forming a feedback loop between the physics-driven standard regularized joint inversion and the case-based deep learning inversion for re-training the case-based deep learning inversion. The method may further include generating an inversion solution for reservoir monitoring by using a hybrid coupled approach of physics-based and deep learning-based inversions with the feedback loop to converge to a true model distribution through an iterative approach.

In general, in one aspect, embodiments relate to a system that includes a drilling system and a logging system that includes a plurality of drill bit logging tools. The logging system is coupled to the drilling system. The system further includes a control system coupled to a plurality of sensors. The system further includes a reservoir simulator that includes a computer processor. The reservoir simulator is coupled to the logging system and the drilling system. The reservoir simulator obtains measured data for a subsurface region. The reservoir simulator obtains prior subsurface data for the subsurface region. The reservoir simulator obtains a physics-driven standard regularized joint inversion for at least two model parameters. The reservoir simulator obtains a case-based deep learning inversion characterized by a contracting path and an expansive path. The reservoir simulator forms the physics-driven deep learning inversion with the physics-driven standard regularized joint inversion, the case-based deep learning inversion, and a coupling operator based on a penalty function. The reservoir simulator forms a feedback loop between the physics-driven standard regularized joint inversion and the case-based deep learning inversion for re-training the case-based deep learning inversion. The reservoir simulator generates an inversion solution for reservoir monitoring using a hybrid coupled approach of physics-based and deep learning-based inversions with the feedback loop to converge to a true model distribution through an iterative approach.

In general, in one aspect, embodiments relate to non-transitory computer readable medium storing instructions executable by a computer processor. The instructions obtain measured data for a subsurface region. The instructions obtain prior subsurface data for the subsurface region. The instructions obtain a physics-driven standard regularized joint inversion for at least two model parameters. The instructions obtain a case-based deep learning inversion characterized by a contracting path and an expansive path. The instructions form the physics-driven deep learning inversion with the physics-driven standard regularized joint inversion, the case-based deep learning inversion, and a coupling operator based on a penalty function. The instructions form a feedback loop between the physics-driven standard regularized joint inversion and the case-based deep learning inversion for re-training the case-based deep learning inversion. The instructions generate an inversion solution for reservoir monitoring using a hybrid coupled approach of physics-based and deep learning-based inversions with the feedback loop to converge to a true model distribution through an iterative approach.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

Like elements in the various figures are denoted by like reference numerals for consistency.

DETAILED DESCRIPTION

Figure 1:
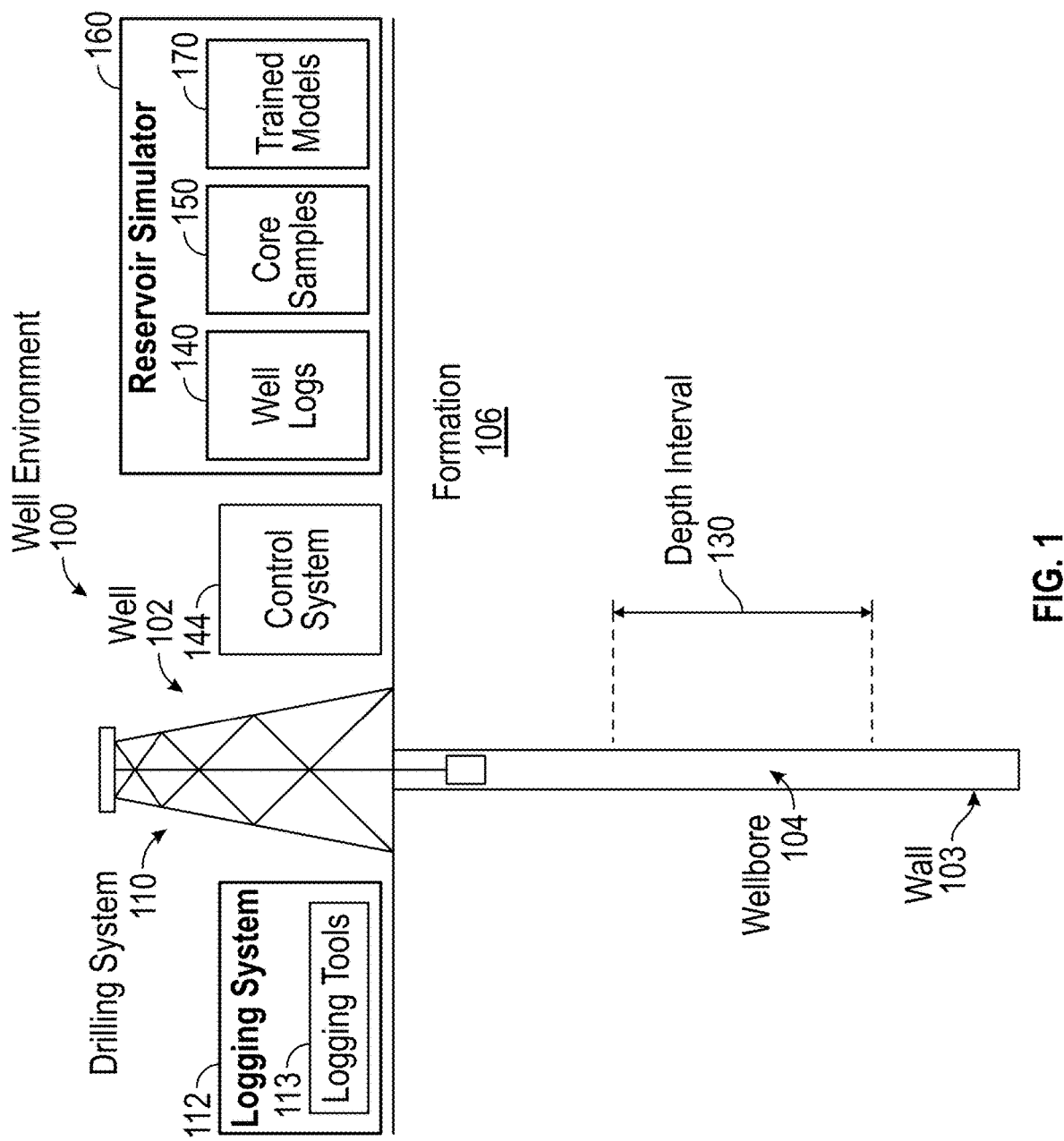
FIG. 1 shows a system in accordance with one or more embodiments.

Specific embodiments of the disclosure will now be described in detail with reference to the accompanying figures.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Oil production is performed in most cases by injecting fluids through injector wells, possibly at the periphery of the reservoir, to sweep the oil in place and sustain pressure at producing wells. These recovery operations are typically classified as primary recovery (spontaneous), secondary (e.g. waterflooding) or enhanced oil recovery operations (EOR) (e.g. $CO_2$ injection, for example). The injected fluid displaces the oil in place by pushing it toward the producers. The rock formations where the oil is stored are far from being homogeneous so that the prediction of how the injected fluid moves underground (and how the oil is displaced) is uncertain and can only be predicted to a certain degree by mathematical models such as fluid flow simulators (or reservoir simulators). Direct measurements of the oil-water saturations and column thickness can be performed in wells. Injected tracers can also be detected and quantified from well fluid samples. Existing patterns of wells are, in most cases, insufficient to provide a comprehensive mapping capability of fluid distribution in the inter-well space.

Remote sensing techniques such as geophysical methods (e.g., seismic, gravity, electromagnetics) rely on the measurement of "fields" (e.g., travel-time/amplitudes, gravity acceleration, electric/magnetic fields) from remote locations such as the surface or other boreholes. Physics provide the knowledge of the relations between rock properties (e.g., P-velocity/S-velocity, density, resistivity, porosity, saturations, etc.) and corresponding measured fields given certain conditions (e.g., geometry of acquisition, other rock properties, etc.). The mathematical modeling of such fields given some prior property distribution (e.g., by finite difference-FD, finite element-FE, finite volume method-FVM, etc. techniques), provide the mechanism of mapping/locating specific properties into the model by means of a process called geophysical inversion or generically inversion methods.

In general, embodiments of the disclosure include systems and methods for generating and using a model that is trained using geophysical inversion or inversion methods for reservoir monitoring of the wellbore. In particular, embodiments disclosed herein relate to the use of a hybrid approach combining physics-driven and machine learning/deep learning inversions to map and monitor the depletion of oil in the reservoir as the consequence of production with geophysical methods. As described and shown in the drawings, algorithms and workflows implement a hybrid scheme of physics-driven inversion and case-driven machine learning (deep learning) inversion for implementing multi-parameter joint inversion. Embodiments disclosed herein involve the simultaneous estimation of multiple model parameters through an inversion process where observed measurements (data space/input) are converted to multiple property distributions (parameter or model space/output) where a performance criterion is optimized.

FIG. 1 shows a schematic diagram in accordance with one or more embodiments. FIG. 1 illustrates a well environment (100) that may include a well (102) with a wall (103) having a wellbore (104) extending into a formation (106). The wellbore (104) may include a bored hole that extends from the surface into a target zone of the formation (106), such as a reservoir (not shown). The formation (106) may include various formation characteristics of interest, such as formation porosity, formation permeability, resistivity, water saturation, and free water level (FWL). Porosity may indicate how much void space exists in a particular rock within an area of interest in the formation (106), where oil, gas or water may be trapped. Permeability may indicate the ability of liquids and gases to flow through the rock within the area of interest. Resistivity may indicate how strongly rock or fluid within the formation (106 opposes the flow of electrical current. For example, resistivity may be indicative of the porosity of the formation (106) and the presence of hydrocarbons. More specifically, resistivity may be relatively low for a formation that has high porosity and a large amount of water, and resistivity may be relatively high for a formation that has low porosity or includes a large amount of hydrocarbons. Water saturation may indicate the fraction of water in a given pore space.

Keeping with FIG. 1, the well environment (100) may include a drilling system (110), a logging system (112), a control system (144), and a reservoir simulator (160). The drilling system (110) may include a drill string, drill bit or a mud circulation system for use in boring the wellbore (104) into the formation (106. The control system (144) may include hardware or software for managing drilling operations or maintenance operations. For example, the control system (144) may include one or more programmable logic controllers (PLCs) that include hardware or software with functionality to control one or more processes performed by the drilling system (110). Specifically, a programmable logic controller may control valve states, fluid levels, pipe pressures, warning alarms, or pressure releases throughout a drilling rig. In particular, a programmable logic controller may be a ruggedized computer system with functionality to withstand vibrations, extreme temperatures (for example, ~575° C.), wet conditions, or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress. For more information on an example of a drilling system, see FIGS. 2A and 2B and the accompanying description.

The logging system (112) may include one or more logging tools (113), such as a nuclear magnetic resonance (NMR) logging tool or a resistivity logging tool, for use in generating well logs (140) of the formation (106). For example, a logging tool may be lowered into the wellbore (104) to acquire measurements as the tool traverses a depth interval (130) (for example, targeted reservoir section) of the wellbore (104). The plot of the logging measurements versus depth may be referred to as a "log" or "well log". Well logs (104) may provide depth measurements of the well (102) that describe such reservoir characteristics as formation porosity, formation permeability, resistivity, water saturation, and the like. The resulting logging measurements may be stored or processed or both, for example, by the control system (144), to generate corresponding well logs (140) for the well (102). A well log may include, for example, a plot of a logging response time versus true vertical depth (TVD) across the depth interval (130) of the wellbore (104).

Reservoir characteristics may be determined using a variety of different techniques. For example, certain reservoir characteristics can be determined via coring (for example, physical extraction of rock samples) to produce core samples (150) or logging operations (for example, wireline logging, logging-while-drilling (LWD) and measurement-while-drilling (MWD)). Coring operations may include physically extracting a rock sample from a region of interest within the wellbore (104) for detailed laboratory analysis. For example, when drilling an oil or gas well, a coring bit may cut plugs (or "cores") from the formation (106) and bring the plugs to the surface, and these core samples may be analyzed at the surface (for example, in a lab) to determine various characteristics of the formation (106) at the location where the sample was obtained. One example of a reservoir characteristic is the amount of oil present in the reservoir, and monitoring or observing the depletion of oil from the reservoir. Reservoir monitoring is an operation involving the mapping of fluid movements within the reservoir as a consequence of oil production.

Multiple types of logging techniques are available for determining various reservoir characteristics, and a particular form of logging may be selected and used based on the logging conditions and the type of desired measurements. For example, NMR logging measures the induced magnetic moment of hydrogen nuclei (that is, protons) contained within the fluid-filled pore space of porous media (for example, reservoir rocks). Thus, NMR logs may measure the magnetic response of fluids present in the pore spaces of the reservoir rocks. In so doing, NMR logs may measure both porosity and permeability as well as the types of fluids present in the pore spaces. For determining permeability, another type of logging may be used that is called spontaneous potential (SP) logging. SP logging may determine the permeabilities of rocks in the formation (106) by measuring the amount of electrical current generated between a drilling fluid produced by the drilling system (110) and formation water that is present in pore spaces of the reservoir rock. Porous sandstones with high permeabilities may generate more electricity than impermeable shales. Thus, SP logs may be used to identify sandstones from shales.

To determine porosity in the formation (106), various types of logging techniques may be used. For example, the logging system (112) may measure the speed that acoustic waves travel through rocks in the formation (106). This type of logging may generate borehole compensated (BHC) logs, which are also called sonic logs and acoustic logs. In general, sound waves may travel faster through shales than through sandstones because shales generally have greater density than sandstones. Likewise, density logging may also determine porosity measurements by directly measuring the density of the rocks in the formation (106). In addition, neutron logging may determine porosity measurements by assuming that the reservoir pore spaces within the formation (106) are filled with either water or oil and then measuring the amount of hydrogen atoms (that is, neutrons) in the pores. Furthermore, the logging system (112) may determine geological data for the well (102) by measuring corresponding well logs (140) and data regarding core samples (150) for the well (102).

Keeping with the various types of logging techniques, resistivity logging may measure the electrical resistivity of rock or sediment in and around the wellbore (104). In particular, resistivity measurements may determine what types of fluids are present in the formation (106) by measuring how effective these rocks are at conducting electricity. Because fresh water and oil are poor conductors of electricity, they have high relative resistivities. For example, an electrical resistivity of oil ranges from $4.5455 \times 10^6$ to $1.4925 \times 10^8$ ohm-meter and the electrical resistivity of fresh water aquifers is in the range of 10-100 ohm-meter. As such, resistivity measurements obtained via such logging can be used to determine corresponding reservoir water saturation ($S_w$).

Turning to the reservoir simulator (160), the reservoir simulator (160) may include hardware or software with functionality for generating one or more trained models (170) regarding the formation (106). For example, the reservoir simulator (160) may store well logs (140) and data regarding core samples (150), and further analyze the well log data, the core sample data, seismic data, or other types of data to generate or update the one or more trained models (170) having a complex geological environment. For example, different types of models may be trained, such as artificial intelligence, convolutional neural networks, deep neural networks, support vector machines, decision trees, inductive learning models, deductive learning models, and supervised learning models, and are capable of approximating solutions of complex non-linear problems. The reservoir simulator (160) may couple to the logging system (112) and the drilling system (110).

In some embodiments, the reservoir simulator (160) may include functionality for applying deep learning or artificial intelligence methodologies to precisely determine various subsurface layers. To do so, a large amount of interpreted data may be used to train a model. To obtain this amount of data, the reservoir simulator (160) may augment acquired data for various geological scenarios and drilling situations. For example, drilling logs may provide similar log signatures for a particular subsurface layer except where a well encounters abnormal cases. Such abnormal cases may include, for example, changes in subsurface geological compositions, well placement of artificial materials, or various subsurface mechanical factors that may affect logging tools. As such, the amount of well data with abnormal cases available to the reservoir simulator (160) may be insufficient for training a model. Therefore, in some embodiments, a reservoir simulator (160) may use data augmentation to generate a dataset that combines original acquired data with augmented data based on geological and drilling factors. This supplemented dataset may provide sufficient training data to train a model accordingly.

In some embodiments, the reservoir simulator (160) is implemented in a software platform for the control system (144). The software platform may obtain data acquired by the drilling system (110) and logging system (112) as inputs, which may include multiple data types from multiple sources. The software platform may aggregate the data from these systems (110, 112) in real time for rapid analysis. Real-time of or relating to computer systems in the software platform is defined as the actual time for updating information with instantaneous processing at the same rate as required by a user or necessitated by a process being controlled. In some embodiments, the control system (144), the logging system (112), or the reservoir simulator (160) may include a computer system that is similar to the computer system (700) described with regard to FIGS. 7A and 7B and the accompanying description.

Figure 2A:
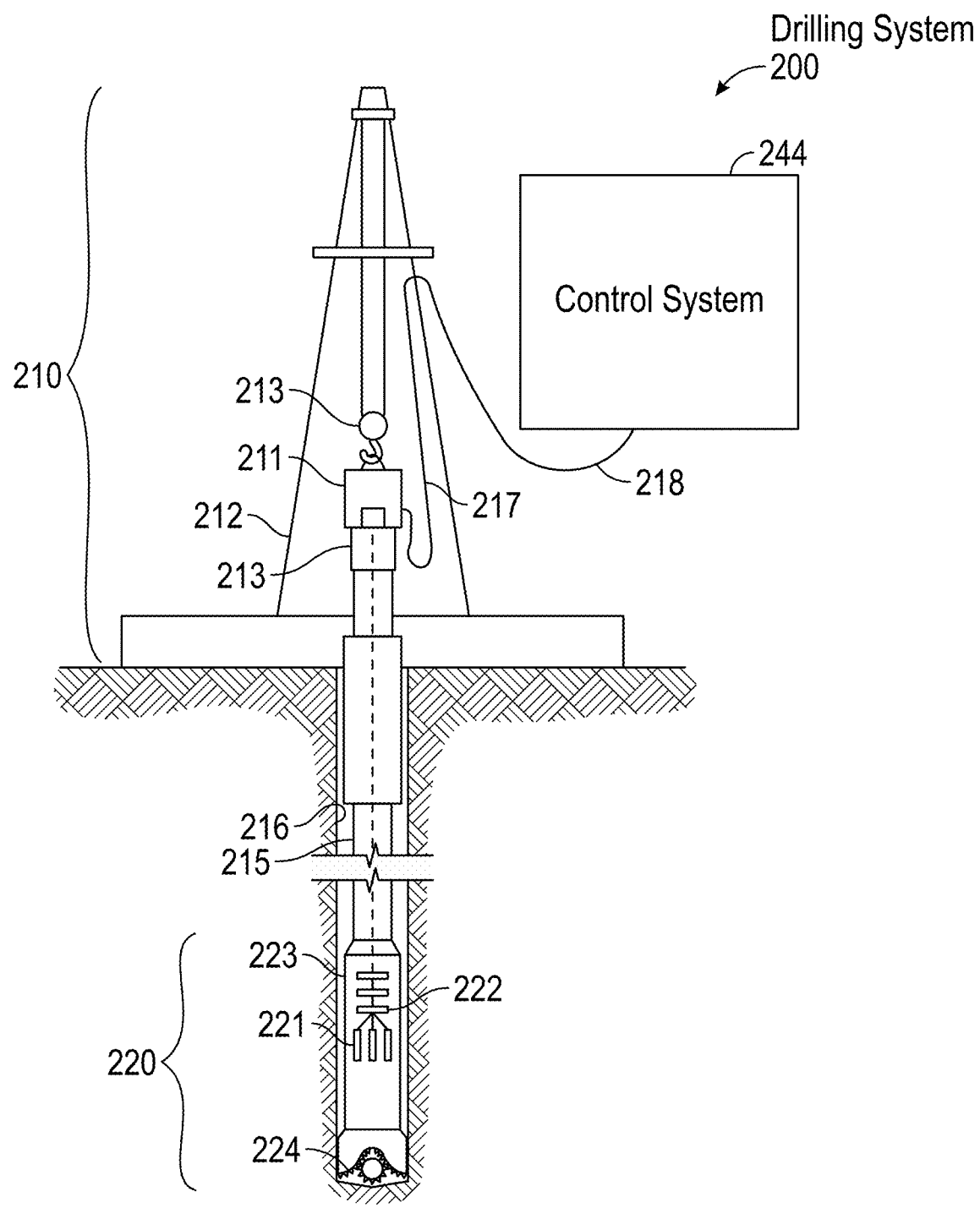
FIGS. 2A and 2B show systems in accordance with one or more embodiments.
Figure 2B:
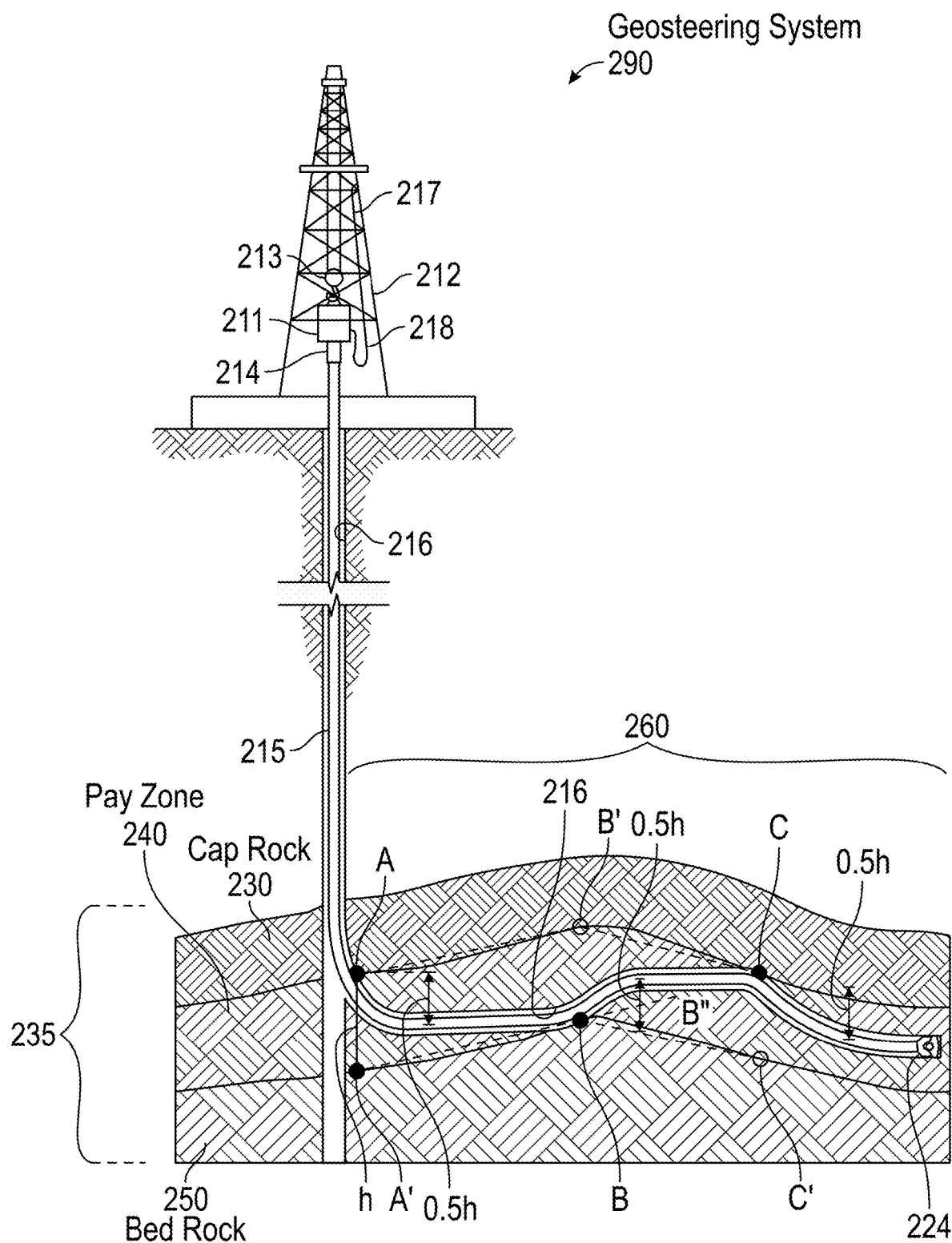

FIGS. 2A and 2B illustrate systems in accordance with one or more embodiments. As shown in FIG. 2A, a drilling system (200) may include a top drive drill rig (210 arranged around the setup of a drill bit logging tool (220). A top drive drill rig (210) may include a top drive (211) that may be suspended in a derrick (212) by a travelling block (213). In the center of the top drive (211), a drive shaft (214) may be coupled to a top pipe of a drill string (215), for example, by threads. The top drive (211) may rotate the drive shaft (214) so that the drill string (215) and a drill bit logging tool (220) cut the rock at the bottom of a wellbore (216). A power cable (217) supplying electric power to the top drive (211) may be protected inside one or more service loops (218) coupled to a control system (244). As such, drilling mud may be pumped into the wellbore (216) through a mud line, the drive shaft (214), or the drill string (215). The control system (244) may be similar to control system (144) described in FIG. 1 and the accompanying description.

Moreover, when completing a well, casing may be inserted into the wellbore (216). A wall of the wellbore (216) may require support, and thus the casing may be used for supporting the wall of the wellbore (216). As such, a space between the casing and the untreated wall of the wellbore (216) may be cemented to hold the casing in place. The cement may be pumped through a lower end of the casing and into an annulus between the casing and the wall of the wellbore (216). In some embodiments, a cementing plug may be used for pushing the cement from the casing. For example, the cementing plug may be a rubber plug used to separate cement slurry from other fluids, reducing contamination and maintaining predictable slurry performance. A displacement fluid, such as water, the drilling fluid or a weighted drilling mud, may be pumped into the casing above the cementing plug. This displacement fluid may be pressurized fluid that serves to urge the cementing plug downward through the casing to extrude the cement from the casing outlet and back up into the annulus.

As further shown in FIG. 2A, sensors (221) may be included in a sensor assembly (223), which is positioned uphold adjacent to a drill bit (224) and coupled to the drill string (215). Sensors (221 may also be coupled to a processor assembly (222) that includes a processor, memory, and an analog-to-digital converter for processing sensor measurements. For example, the sensors (221) may include acoustic sensors, such as accelerometers, measurement microphones, contact microphones, and hydrophones. Likewise, the sensors (221) may include other types of sensors, such as transmitters and receivers to measure resistivity or gamma ray detectors. The sensors (221) may include hardware or software or both for generating different types of well logs (such as acoustic logs or sonic longs) that may provide data about a wellbore on the formation, including porosity of wellbore sections, gas saturation, bed boundaries in a geologic formation, fractures in the wellbore or completion cement. If such well data is acquired during drilling operations (that is, logging-while-drilling), then the information may be used to make adjustments to drilling operations in real-time. Such adjustments may include rate of penetration (ROP), drilling direction, and altering mud weight.

In some embodiments, acoustic sensors may be installed in a drilling fluid circulation system of a drilling system (200) to record acoustic drilling signals in real-time. Drilling acoustic signals may transmit through the drilling fluid to be recorded by the acoustic sensors located in the drilling fluid circulation system. The recorded drilling acoustic signals may be processed and analyzed to determine well data, such as lithological and petrophysical properties of the rock formation. This well data may be used in various applications, such as steering a drill bit using geosteering, and casing shoe positioning.

The control system (244) may be coupled to the sensor assembly (223) in order to perform various program functions for up-down steering and left-right steering of the drill bit (224) through the wellbore (216). More specifically, the control system (244) may include hardware or software with functionality for geosteering a drill bit through a formation in a lateral well using sensor signals, such as drilling acoustic signals or resistivity measurements. For example, the formation may be a reservoir region, such as a pay zone, bed rock, or cap rock.

Turning to geosteering, geosteering may be used to position the drill bit (224) or drill string (215) relative to a boundary between different subsurface layers (for example, overlying, underlying, and lateral layers of a pay zone) during drilling operations. In particular, measuring rock properties during drilling may provide the drilling system (200) with the ability to steer the drill bit (224) in the direction of desired hydrocarbon concentrations. As such, a geosteering system may use various sensors located inside or adjacent to the drilling string (215) to determine different rock formations within a wellbore path. In some geosteering systems, drilling tools may use resistivity or acoustic measurements to guide the drill bit (224) during horizontal or lateral drilling. When resistivity measurements are employed, the upper and lower boundaries of a subsurface layer are computed from geological models using inversion techniques. A geological model may include predefined resistivity levels for various layers, such as a predefined resistivity of a pay zone within the subsurface. When sonic measurements are employed, the upper and lower boundaries of a layer may be calculated based on the travelling time of reflected sonic waves and the corresponding sonic velocity of formation rocks.

FIG. 2B illustrates some embodiments for steering a drill bit through a lateral pay zone using a geosteering system (290). The geosteering system (290) may include the drilling system (200) from FIG. 2A. In particular, the geosteering system (290) may include functionality for monitoring various sensor signatures (for example, an acoustic signature from acoustic sensors) that gradually or suddenly change as the wellbore path traverses a cap rock (230), a pay zone (240), and a bed rock (250). Because of the sudden change in lithology between the cap rock (230) and the pay zone (240), for example, a sensor signature of the pay zone (240) may be different from the sensor signature of the cap rock (230). When the drill bit (224) drills out of the pay zone (240) into the cap rock (230), an observed amplitude spectrum of a particular sensor type may change suddenly between the two distinct sensor signatures. In contrast, when drilling from the pay zone (240) downward into the bed rock (250), the observed amplitude spectrum may gradually change.

During the lateral drilling of the wellbore (216), preliminary upper and lower boundaries of a formation may be derived from a geophysical survey or an offset well obtained before drilling the wellbore (216). If a vertical section (235) of the well is drilled, an actual upper and lower boundaries of a formation layer (that is, actual pay zone boundaries (A, A')) and the pay zone thickness (that is, A to A') at the vertical section (235) may be determined. Based on this well data, an operator may steer the drill bit (224) through a lateral section (260) of the wellbore (216) in real time. In particular, a logging tool may monitor a detected sensor signature proximate the drill bit (224), where the detected sensor signature may continuously be compared against known sensor signatures, for example, of the cap rock (230), pay zone (240), and bed rock (250), respectively. As such, if the observed sensor signature of drilled rock is the same or similar to the sensor signature of the pay zone (240), the drill bit (224) may still be drilling in the pay zone (240). In this scenario, the drill bit (224) may continue to drill along its current path. If the observed sensor signature is same as or similar to the known sensor signatures of the cap rock (230) or the bed rock (250), respectively, then the control system (244) may determine that the drill bit (224) is drilling out of the pay zone (240) and into the upper or lower boundary of the pay zone (240). At this point, the vertical position of the drill bit (224) at this lateral position within the wellbore (216) may be determined and the upper and lower boundaries of the pay zone (240) may be updated, (for example, positions B and C in FIG. 2B). In some embodiments, the vertical position at the opposite boundary may be estimated based on the predetermined thickness of the pay zone (240), such as positions B' and C'.

Returning to FIG. 1, in some embodiments, a well path of a wellbore (104) is updated using a trained model (for example, one of the trained models (170)) by the control system (144). For example, a control system (144) may communicate geosteering commands to the drilling system (110) based on well data updates that are further adjusted by the reservoir simulator (160) using a trained model. As such, the control system (144) may generate one or more control signals for drilling equipment based on an updated well path design or reservoir model.

While FIGS. 1, 2A, and 2B show various configurations of components, other configurations may be used without departing from the scope of the disclosure. For example, various components in FIGS. 1, 2A, and 2B may be combined to create a single component. As another example, the functionality performed by a single component may be performed by two or more components.

Figure 3A:
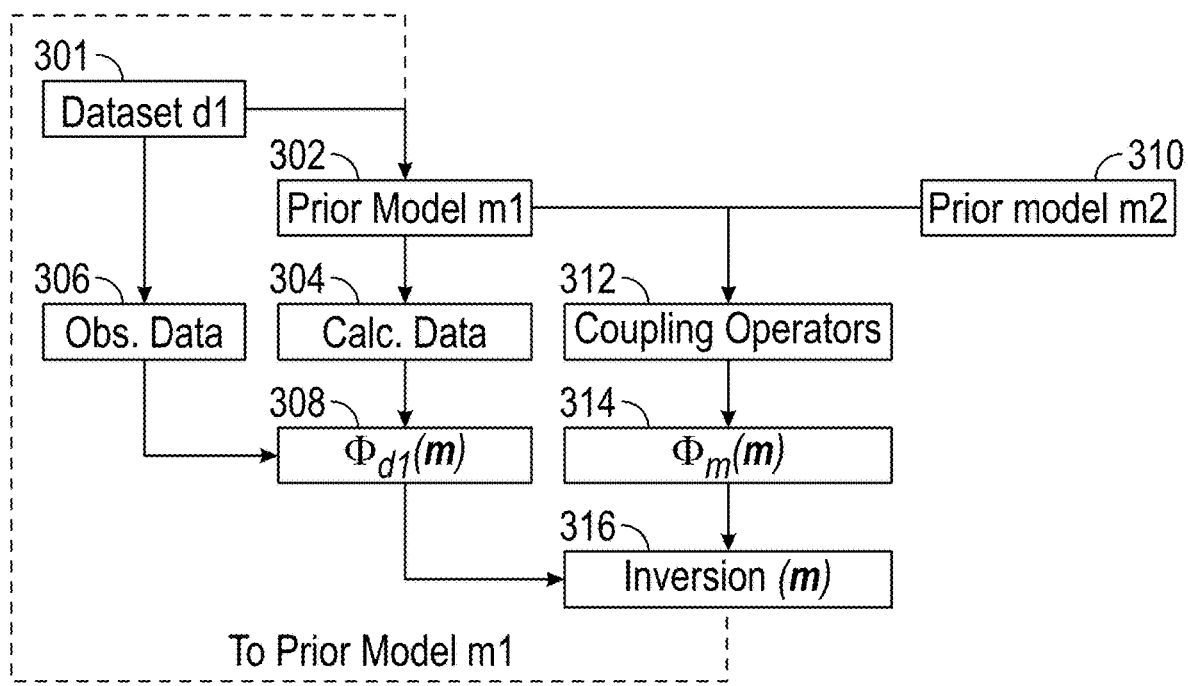
FIGS. 3A and 3B show invention flow diagrams in accordance with one or more embodiments.
Figure 3B:
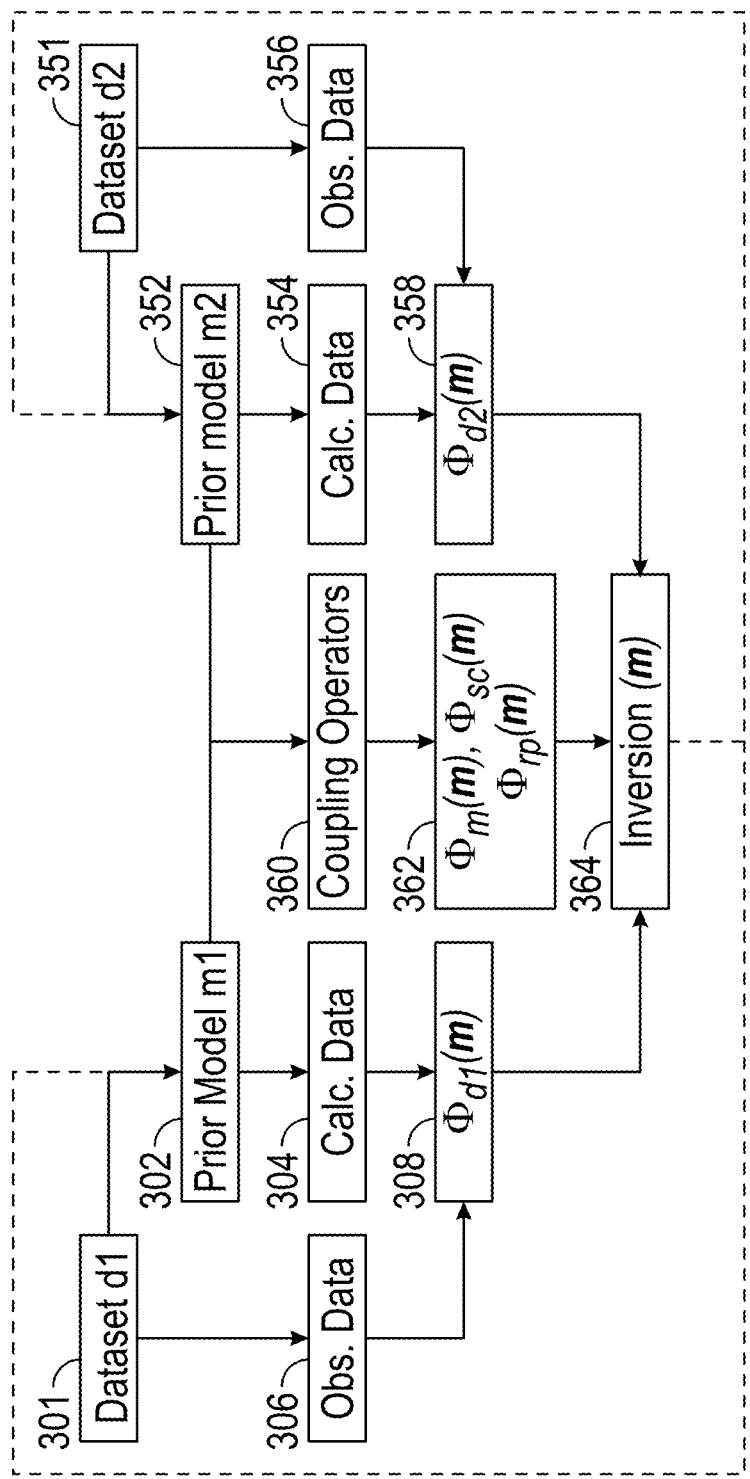

FIGS. 3A and 3B illustrate inversion flow diagrams in accordance with one or more embodiments. Turning to FIG. 3A, FIG. 3A describes a general scheme for a physics-driven standard regularized inversion based on linear algebra for a single model parameter. The process typically starts from a dataset d1 (301) and a prior model (initial model/prior model 1) (302) that is used to calculate predicted data through a forward operator. The difference between calculated (304) and observed data (306) is used to build a data misfit objective function ($\phi_{d1}$) (308) where the linearized form of the forward data residual is differentiated towards the parameters of the model. The forward operator provides the sensitivity of the data to the model parameters. The regularization of the inversion can be performed by using a reference model (prior model 2) (310) that is used to link the model parameters resulting from the minimization of $\phi_{d1}$ (308) to some a-priori knowledge of the model parameters (reference model) using a coupling operator (312). This is expressed by an objective function $\phi_m$ (314). The model objective function can also contain other regularization mechanisms acting on the model parameters such as a Laplacian smoothness (or other functions), a covariance matrix, gradient-based coupling operators (cross-gradient, summative gradients), rock-physics coupling operators, etc. (i.e., generically called "penalty functions"). The penalty function can take various forms, for example, model reference, cross-gradient, summative gradient, and rock physics. The simultaneous minimization of $\phi_{d1}$ and $\phi_m$ provides model parameters that are honoring the data misfit minimization subject to external constraints acting on the model. In one or more embodiments, weights may also be introduced to balance how much one or the other term would prevail during the minimization. The model parameters (prior model 1) are then updated with the results of the inversion (316) and a new inversion iteration is started. The iterative process is stopped when one or multiple criteria are met in the minimization of the composite objective function.

Turning to FIG. 3B, FIG. 3B describes a general scheme for a physics-driven standard regularized inversion based on linear algebra for a case of joint inversion (of multiple model parameters) in accordance to one or more embodiments.

Joint Inversion Scheme: A model space characterized by the model vector m=[$m_1$, $m_2$] consisting of property components from different geophysical domains is defined. A data space by d=[$d_1$, $d_2$] obtained from different geophysical measurements (for simplicity only two domains are considered in this example) is defined. A joint inversion (JI) algorithm can be formulated as a constrained least squares problem solved by minimizing a composite objective function consisting of a data misfit, a model regularization function, and two inter-domain coupling operators: structure (e.g., gradient based), constraining the shapes, and rock-physics (e.g., regression based), constraining the property values:

$$\phi_t(m) = \phi_d(m) + \mu_1 \phi_m(m) + \mu_2 \phi_x(m) + \mu_3 \phi_{rp}(m), \qquad (1)$$

where $\mu_i$, i=1, . . . 3 are misfit weights.

The data misfit is defined as:

$$\phi_d(m) = (Jm - d_{obs})^T W_d^T W_d (Jm - d_{obs}) = \| W_d (Jm - d_{obs}) \|_{L_2}^2, \qquad (2)$$

where $d_{obs}$ is the vector of the observed data, J is the Jacobian or the sensitivity matrix, and $W_d$ is a data weighting (or covariance) matrix taking into account the relative importance of the observations and the effect of the noise in the data.

The model regularization function $\phi_m(m)$ is defined as:

$$\phi_m(m) = (m - m_0)^T W_m^T W_m (m - m_0) = \| W_m (m - m_0) \|_{L_2}^2, \qquad (3)$$

where $m_0$, is the prior model and $W_m$ is a model weighting matrix (and $W_m^T W_m$ the equivalent inverse covariance). The two remaining misfit terms, $\phi_x(m)$ and $\phi_{rp}(m)$ are the structure and rock-physics operators, which make $\phi_t(m)$ a joint inversion objective function.

The process typically start for the case of one inversion iteration for two model parameter distributions where the model parameters can be of different nature, for example seismic velocity and resistivity. The overall scheme of the joint inversion is not changing by increasing the number of parameters. In a standard regularized joint inversion approach (350), more coupling operators (360) are introduced that are of statistical nature. In particular a coupling operator linking the shape of the parameter distribution is used (structure operator: $\phi_{sc}$ and often based on functions of model gradients (cross product: cross gradients, normalized sum: summative gradients, other), and a rock-physics operator ($\phi_{rp}$) linking the parameter values. Often the rock-physics operators are the result of some non-linear regression function fitting a cross-plot of the parameters. Other rock-physics operators can be obtained from other analytical or empirical relations.

In one or more embodiments, weights (or Lagrange multipliers) are typically assigned to the different terms of the objective function to balance the effects of the different components. The joint inversion is performed simultaneously (simultaneous minimization of all the terms—type BB, as shown in FIG. 3B) or by alternating different datasets and keeping the coupling operators in the joint minimization (type AA, as shown in FIG. 3A). As for the previous case (300), the model objective function can also contain other regularization mechanisms acting on the model parameters such as a Laplacian smoothness (or other functions), a covariance matrix, etc. Equations (2) and (3) detail the data misfit function and the model misfit function. All the terms of the composite objective function act on the model parameters (m). The model parameters (prior model 1 (302) and 2 (352)) are then updated with the results of the inversion and a new inversion iteration is started. The iterative process is stopped when one or multiple criteria are met in the minimization of the composite objective function.

Figure 4:
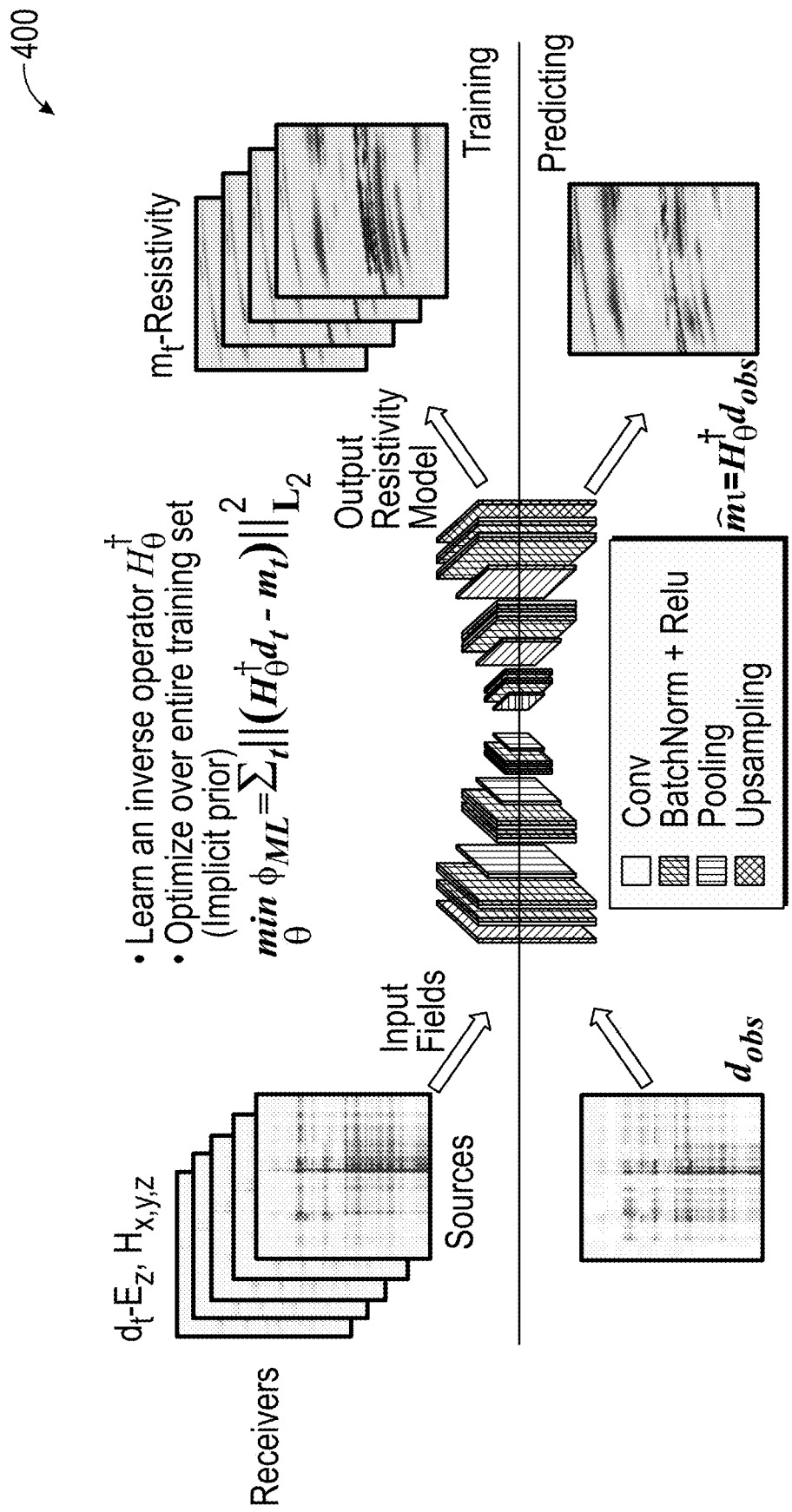
FIG. 4 shows an example in accordance with one or more embodiments.

Turning to FIG. 4, FIG. 4 shows an example (400) of a deep learning neural network in accordance with one or more embodiments. The deep learning neural net is characterized by a contracting path (encoding) and an expansive path (decoding). Each level is composed by a stack of hidden layers characterized by sequential operations of convolution, batch normalization, activation function (for example, Rectified Linear Unit—ReLU) and max-pooling. The output of the sequence becomes the input of another sequence with decreased dimensionality and increased filter depth. As a result, the spatial information along the contraction path is reduced while the extracted feature information is enriched. The expansive path combines the feature and spatial information through a sequence of upsampling and concatenations of the features obtained from the contracting path, with increasing resolution.

Deep Learning Inversion Scheme: The output o of a neural network can be expressed as a nonlinear function h of the input i and of the network hyperparameters (weights and biases) θ:

$$o = h(i, \theta). \quad (4)$$

The previous equation can be used to train the network for an inverse problem by assuming the input $d_t$ and the output $m_t$, and minimizing a least squares deep learning (DL) objective function (i.e., loss function) over the network parameters θ.

$$\phi_{l,m} = \|H_\theta^\dagger d_t - m_t\|_{L_2}^2, \quad (5)$$

where the term $H_\theta^\dagger$ is a pseudoinverse operator parameterized by θ. The loss function $\phi_{l,m}$ is minimized to obtain an optimized set of network parameters θ. The trained network is then used to predict the output $m_l$ from new observed data $d_{obs}$ through the optimized pseudoinverse operator $H_\theta^\dagger$:

$$m_l = H_\theta^\dagger d_{obs} \quad (6)$$

The predicted model $m_l$ can be embedded in an inversion scheme.

Deep learning inversion (type CC, in FIG. 5) is case-based meaning that the pseudoinverse operator $H_\theta^\dagger$ is learned directly from the data through extensive training of the deep learning neural network using synthetic modeling and/or past experience. The deep learning inversion is composed by two steps consisting of a training phase where the network hyperparameters θ are learned from input data and models, and a testing phase (prediction) where the optimized pseudoinverse operator (parameterized by θ) is used to predict the models using observed data. The mechanism used for optimizing the network hyperparameters θ is by means of the minimization of an objective function (equation 5) typically called "loss function" which measures the discrepancy between predicted models with current hyperparameters θ ($H_\theta^\dagger d_t$) and the corresponding known models provided for the training ($m_t$).

The case depicted in FIG. 4 represents an application to electromagnetic (EM) inversion where the input EM fields data (vertical electric field $E_z$, three component magnetic field $H_{x,y,z}$) are used to train a deep learning network to predict resistivity distributions ($m_l$).

Figure 5:
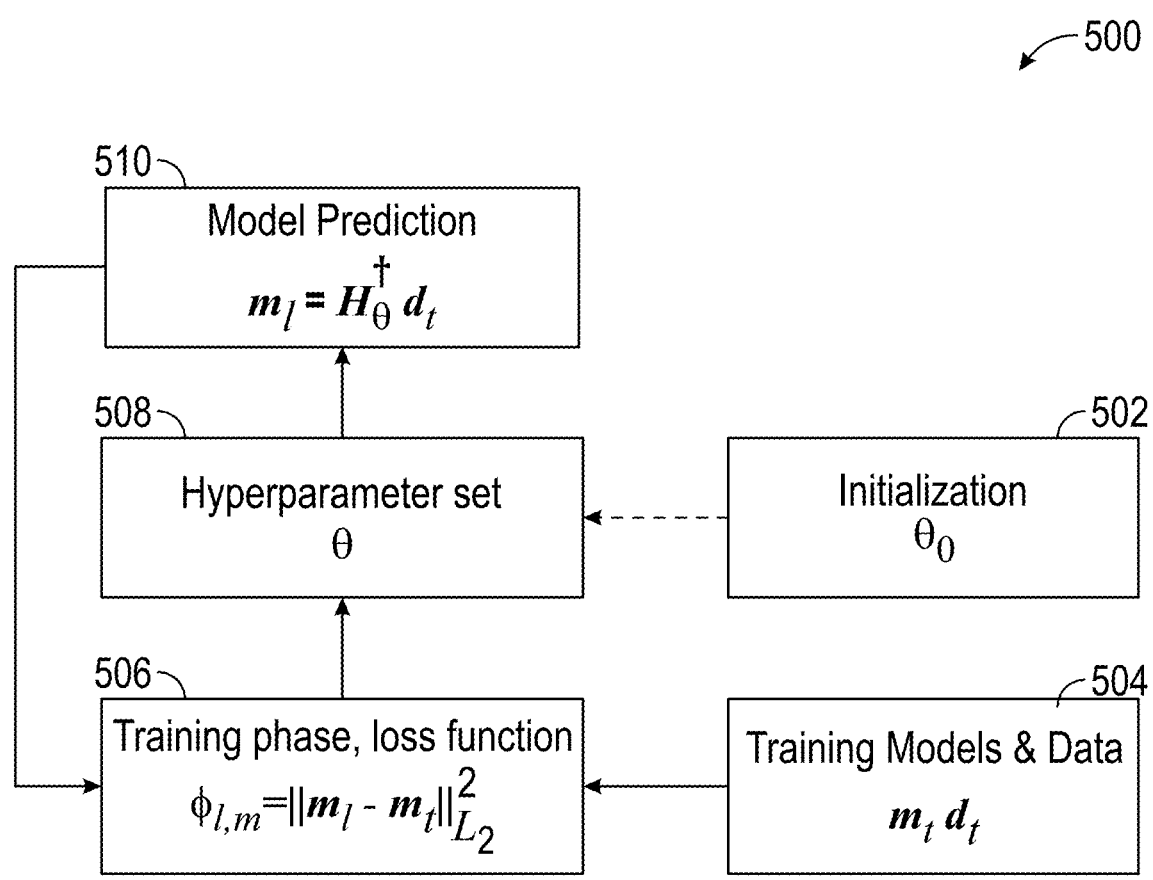
FIG. 5 shows an invention flow diagram in accordance with one or more embodiments.

Turning to FIG. 5, the case-based deep learning inversion (500) is represented as a flow diagram. Referring to equation 4, the output of a neural network can be expressed as a nonlinear function of the input and of the network hyperparameters θ (consisting of weights and biases). Starting from some initialization of the hyperparameter set θ (502) (i.e. $\theta_0$), an objective/loss function is setup where the difference between the predicted models $m_l$ (510) from the deep learning network ($m_l = H_\theta^\dagger d_t$—i.e., equation 6) and the known models $m_t$ (504) is evaluated ($\phi_{l,m} = \|m_l m_t\|_{L_2}^2$) (506). The least-squares (LS) minimization of the loss function ($\phi_{l,m}$) allows to obtain optimized θ parameter sets. The new network parameters are used for model prediction through equation 6. The procedure is then iterated through additional loss function evaluation and parameter optimization until a stopping criteria is reached.

Figure 6:
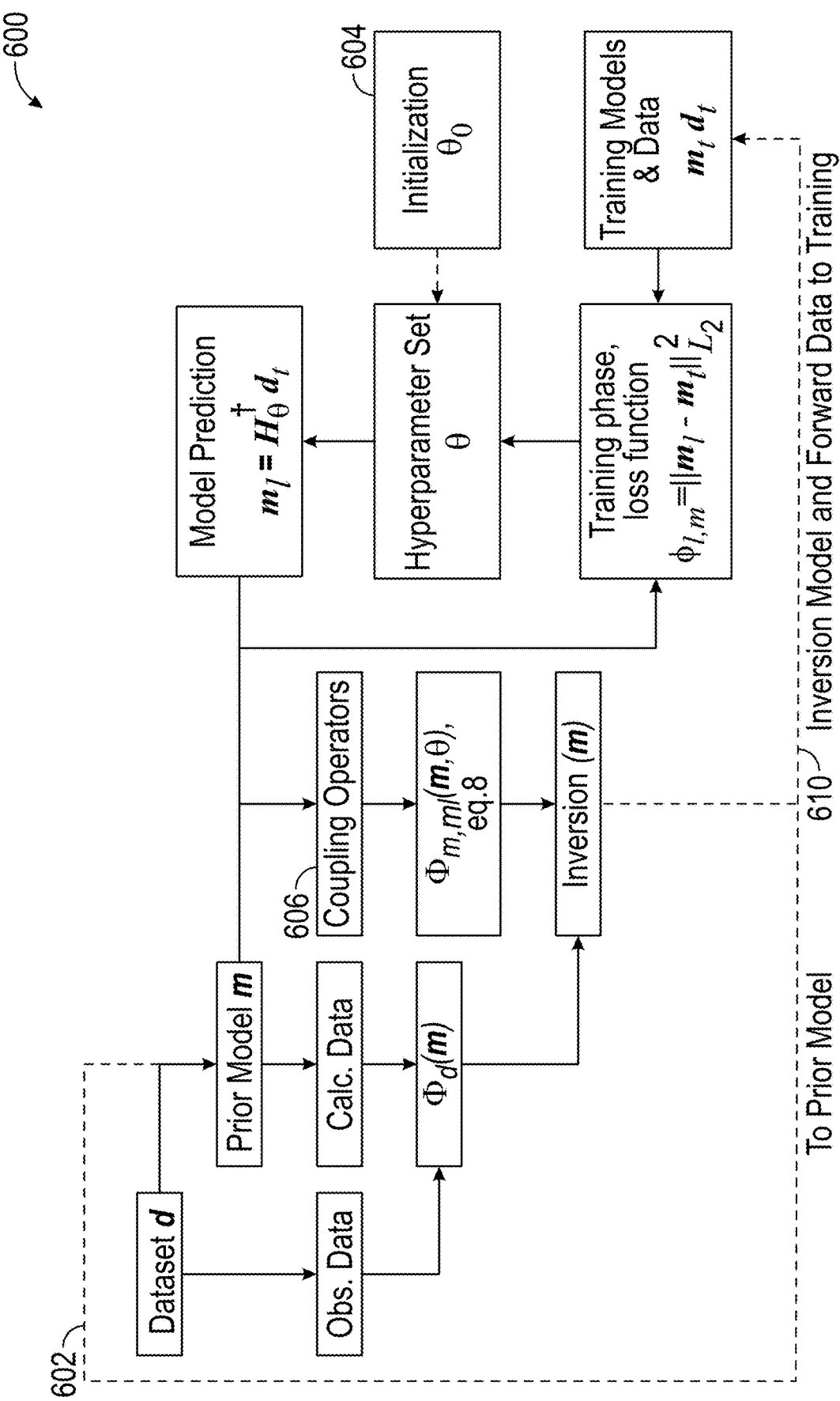
FIG. 6 shows an invention flow diagram in accordance with one or more embodiments.

Turning to FIG. 6, FIG. 6 describes an invention flow diagram of a physics-driven deep learning-based inversion in accordance to one or more embodiments.

Physics-Driven Deep Learning Inversion/Joint Inversion: The deep learning joint inversion objective function can be written as:

$$\phi_t(m, \theta) = \phi_d(m) + \mu_1 \phi_{l,m}(\theta) + \mu_2 \phi_{m,ml}(m, \theta), \quad (7)$$

where:
$\phi_d(m)$ is as (2),
$\phi_{l,m}(\theta)$ is as (5),
$\phi_{m,ml}(m, \theta) = \|W_m(m - m_l(\theta))\|_{L_2}^2. \quad (8)$ Equation (7) can then be solved using alternative minimizations as follows:

$$m^k = \arg\min_m \phi_t(m, \theta^{k-1}) = (\phi_d(m) + \mu_2(\phi_{m,ml}(m, \theta^{k-1}), \quad (9)$$

$$\theta^k = \arg\min_\theta \|H_\theta^\dagger d_t - m^k\|_{L_2}^2, \quad (10)$$

where equation (9) can be solved via traditional regularized inversion and equation (10) using deep learning retraining.

Turning to FIG. 6, the physics-based optimization (602) is joined with the case-based deep learning inversion (604) through a coupling operator (606) linking the model parameters that are predicted by both procedures (type DD, as shown in FIG. 6). Here, it is assumed that the data vector d and the model vector m are expressing multiple data types and multiple model parameters (e.g. seismic velocity, resistivity, density, etc. and associated measured responses, i.e. data). The scheme as shown in FIG. 6 where the output of the deep learning network prediction $m_l$ is used to constrain the physics-based inversion through a model reference objective function. The model reference misfit function $\Phi_{m,ml}(m, \theta)$, equation 8, is used to enforce a similarity between the models obtained from the two distinct procedures. The model reference term is acting as a coupling operator where the structure and rock-physics operators of equation 1 may now be implicitly learned through the deep learning neural network and may not need to appear as separate terms in the deep learning joint inversion objective function (equation 7). One additional property of the flow diagram (600) depicted in FIG. 6 is the feedback loop (610) for re-training the neural network. The output of the deep learning joint inversion procedure (i.e., inversion model and corresponding forward modeled data (612)) are added to the training dataset for further re-training of the network. The results of the inversion are also sent to update the prior model of the physics-based inversion (602). In some embodiments, the output of the deep learning network prediction $m_l$ can also be optionally used as "prior" model other than as the coupling operators. For example, this can be done at the first iteration of the inversion process where instead than to start from some undefined "guess" of the prior, we can use the deep learning network prediction as starting model.

These operations are performed through alternative minimizations as per equations 9 and 10. The two competing procedures will converge to a common model incorporating at the same time physics-based and deep learning, case-based inversions.

Figure 7:
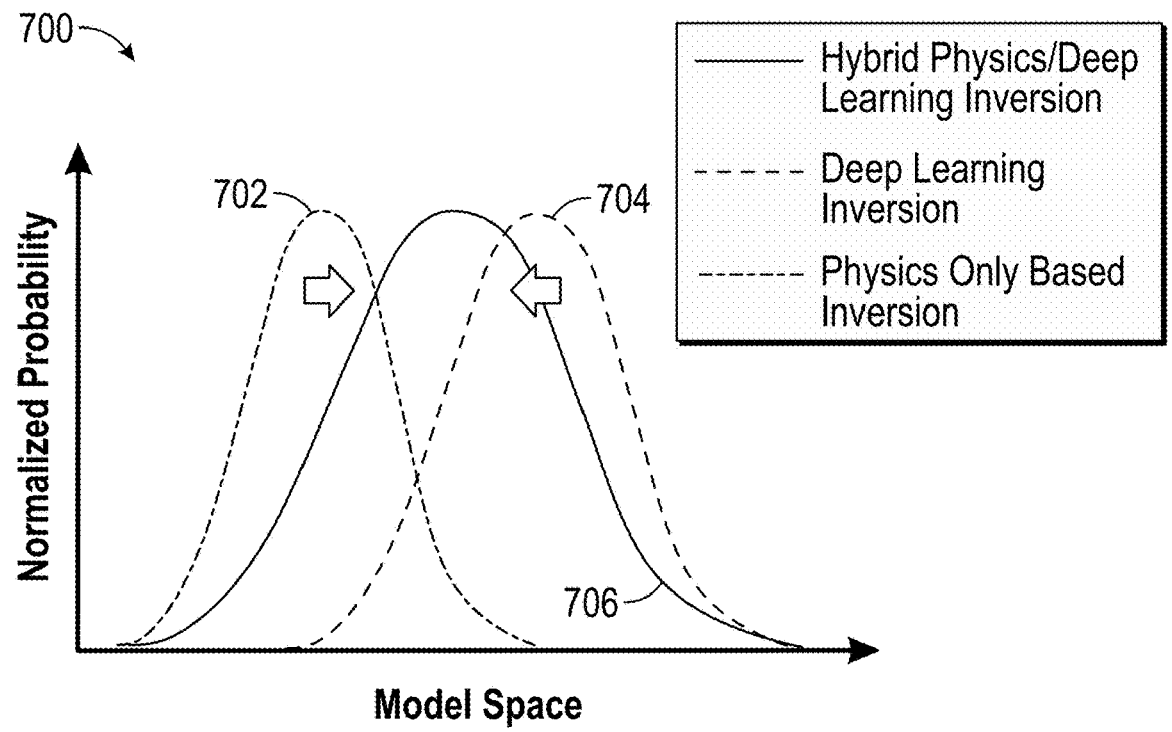
FIG. 7 shows an example in accordance with one or more embodiments.
Figure 8:
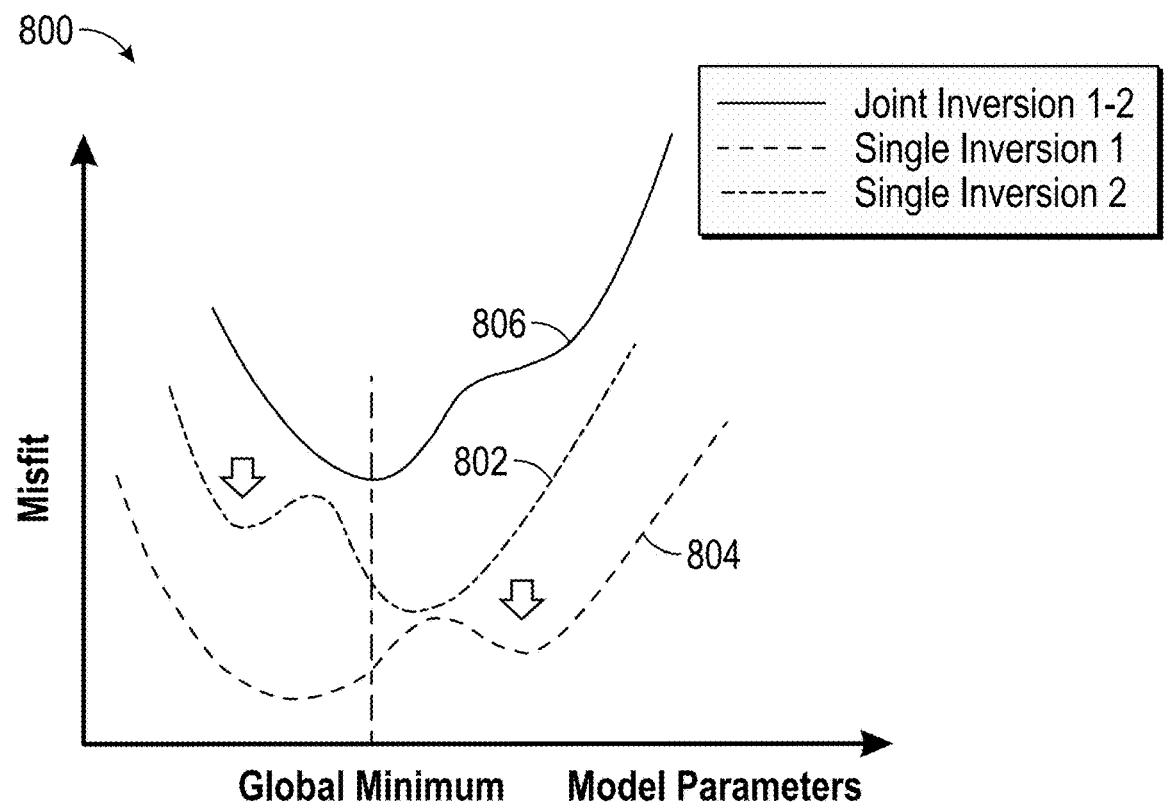
FIG. 8 shows an example in accordance with one or more embodiments.

FIGS. 7 and 8 provide examples in accordance with one or more embodiments. The following examples are for explanatory purposes only and are not intended to limit the scope of the disclosed technology.

Turning to FIG. 7, FIG. 7 shows an example graph (700) of model space sampling and joint inversion objective functions with different methods in accordance with one or more embodiments. A physics-based inversion (702) is limited by the minimization performed in the vicinity of the starting model and needs a solution given a good guess of the model parameter distribution. This operation may lead to explore only a portion of the model space. A case-based deep learning inversion (704) performs a statistical stochastic sampling of the model space assuming that the samples used for the training are different and identically distributed. In other words, the model to be predicted after the training must be comprised within the probability distribution used during the training.

Both conditions described above are difficult to make happen in real case scenarios; it may be possible to approach the true distribution but the right starting model for the physics-based inversion (702) may not have been guessed or enough training on cases for the deep learning-based inversion (704) may not have been performed. The introduction of the hybrid coupled approach of physics-based and deep learning-based inversions (706) with feedback loop on the training allows the inversion to converge to the true model distribution through an iterative approach (See FIG. 6 and equations 7-10). The discussion above is valid for single domain (single parameter) inversions and for multi domain (multi parameter) joint inversions.

Turning to FIG. 8, FIG. 8 shows an example (800) of single domain objective function and multi-parameter joint inversion objective function in accordance with one or more embodiments. The considerations made for FIG. 8 are valid for any inversion scheme that can be related to geophysical data or other. Additional benefits to the inversion are obtained when multi-parameter inversion is considered instead of a single parameter inversion (802 and 804). This concept is expressed qualitatively by the representation of the objective functions during an inversion process. The objective function describes the behavior of a misfit functional where for non-linear inversion problems it can present several local minima and one global minima. The goal is to obtain the parameter distribution corresponding to the global minima of the objective function. The minimization process of a physics-based inversion may easily end in a local minima (arrows) depending on the choice of the initial model and on the shape of the objective function. The simultaneous minimization of multiple parameters (joint inversion) helps reaching the global minima of the solution (806). A physics-driven deep learning inversion/joint inversion addresses the problems described in FIGS. 8 and 9 enabling a comprehensive exploration of the model space and the minimization of one or multiple parameters to reach the global minima of the inversion process.

Figure 9A:
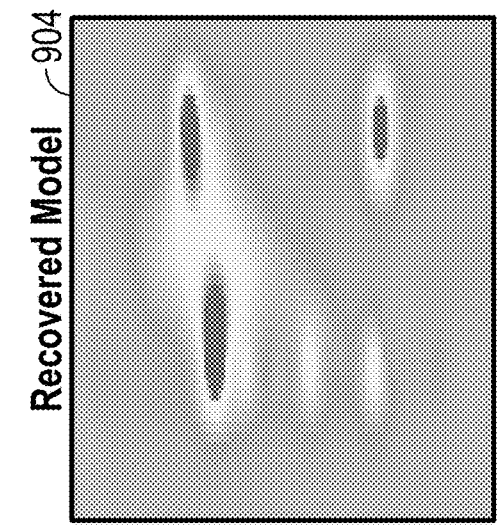
FIGS. 9A-9D show an example in accordance with one or more embodiments.
Figure 9B:
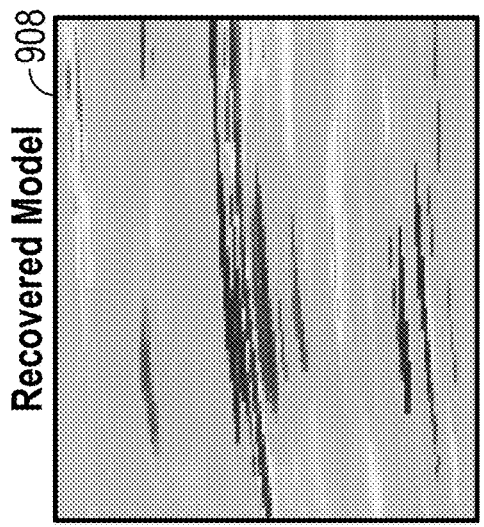
Figure 9C:
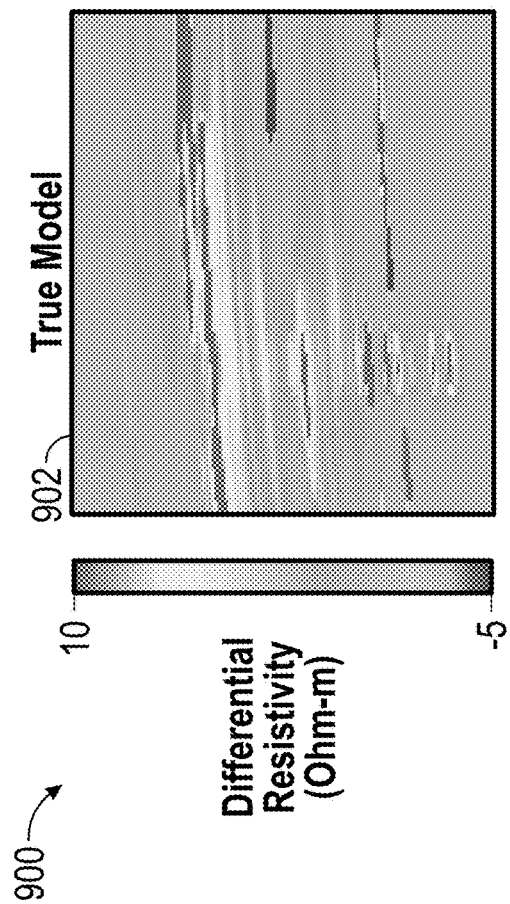

Turning to FIGS. 9A-9C, FIGS. 9A-9C show an example (900) of comparison of inversion results for the same well pair with similar acquisition geometry in accordance with one or more embodiments.

In this example, a black oil fluid flow simulator is used to generate a number of cases through time for training a deep learning network that is later capable of predicting high-resolution distributions of saturation-related resistivity as the result of time-lapse measurements of cross-well electromagnetics (EM). The goal is to track the evolution of the waterflood resulting from production optimization processes, which involve the injection of conductive sea water sweeping resistive oil. In this example, a purely statistical approach is used through deep learning where the network is trained through various saturation cases over the time dimension as generated by a fluid-flow simulator (or reservoir simulator).

Figure 9D:
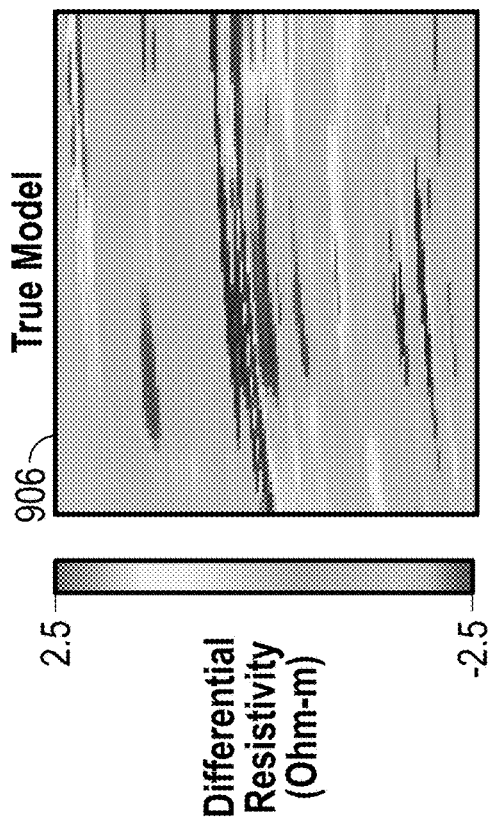

FIGS. 9A and 9B show $CO_2$ injection only (902) and the recovered model from the least-squares standard inversion (904). FIGS. 9C and 9D show Water Alternating Gas (WAG) reservoir true model (906) and recovered model by deep learning inversion (908). As shown in FIGS. 9A-9C, the machine learning approach is superior to an equivalent physics-driven inversion where the regularization imposed to the solution cause loss of details. In some embodiments, the simulator relies on geological information provided by seismic, production information, rock formation properties from wells that might be insufficient when interpolated or extrapolated to the inter-well space, causing erroneous modeling of the fluid flow in the reservoir. For example, if an undetected fracture zone exists in the space between wells, the training performed with the simulated cases will be insufficient to reconstruct the real pattern of fluid saturations (because the fracture corridor model was not included in the deep learning network training). On another side, a remote sensing method such as cross-well EM may detect the fracture corridor as permeated by conductive fluids (saline water—high conductivity/low resistivity) making a large contrast with the oil-saturated rocks (oil—high resistivity).

Such a situation represents the case where a physics-driven inversion can introduce in the system the expression of the fracture corridor geological feature that was unmodeled in the first instance by the reservoir simulator and not part of the deep learning neural network training. The feedback loop with retraining are useful to expand the knowledge base of the machine learning network allowing better predictions at the following iteration.

Figure 10:
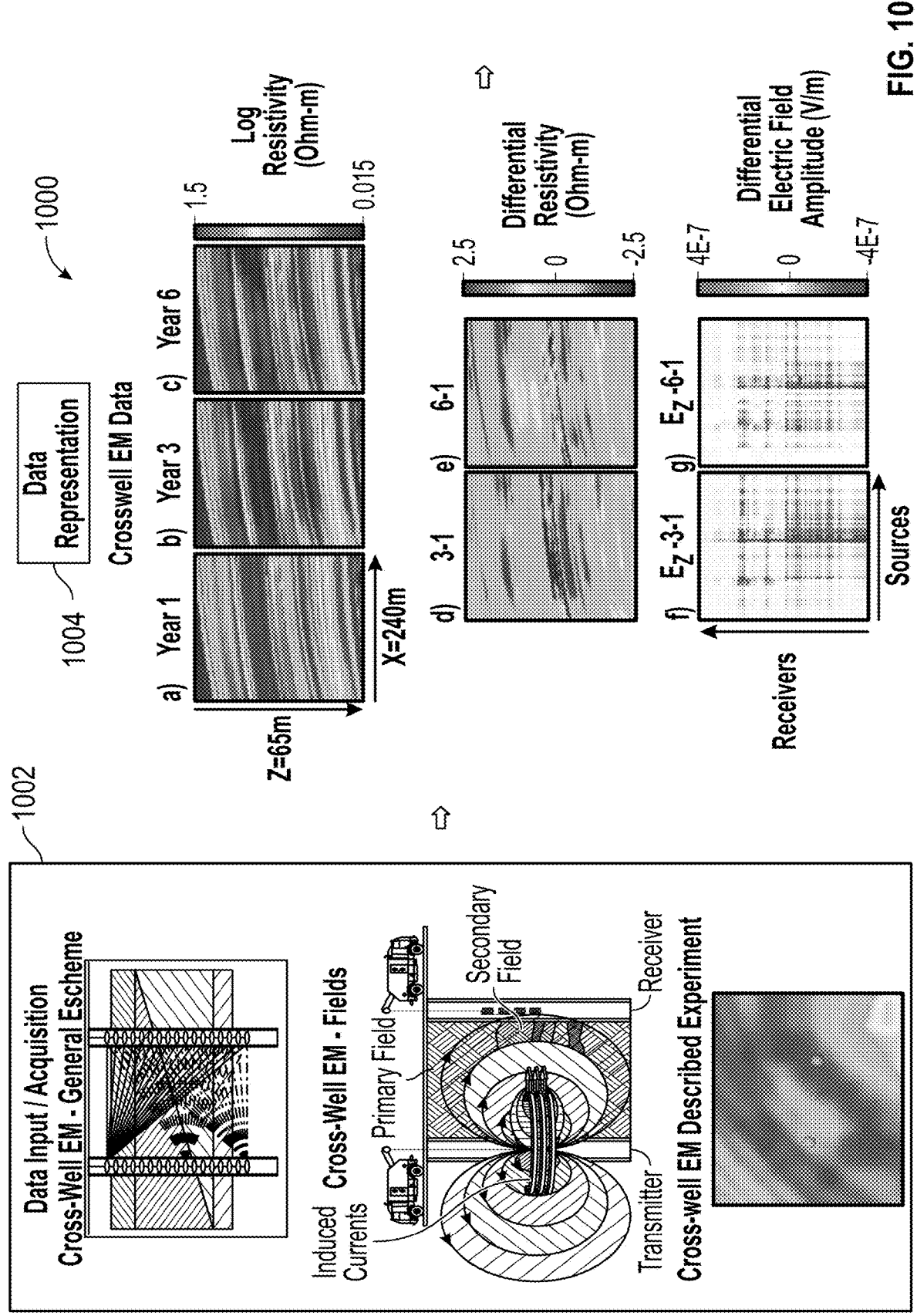
FIG. 10 shows an example in accordance with one or more embodiments.
Figure 10:
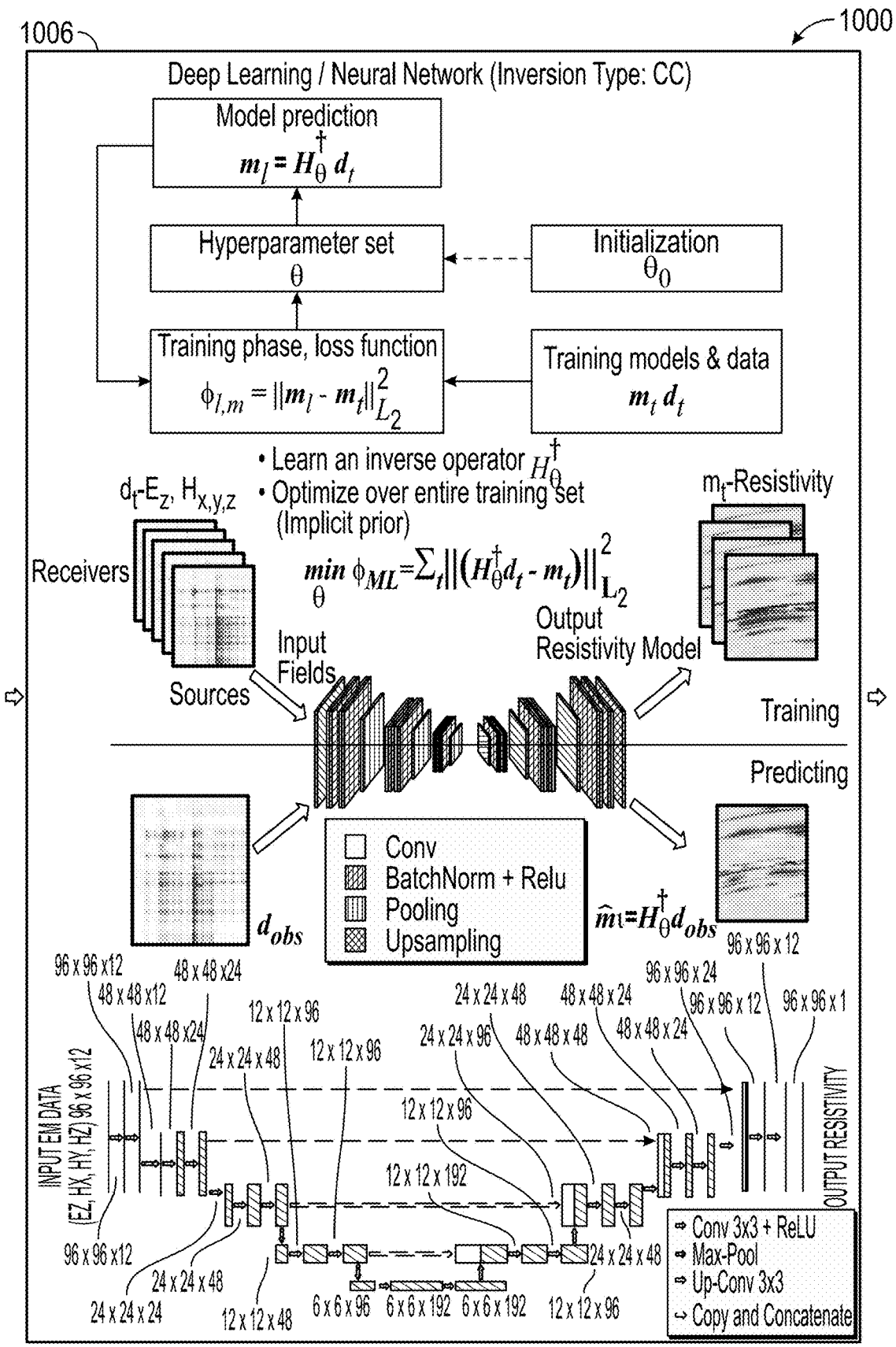
Figure 10:
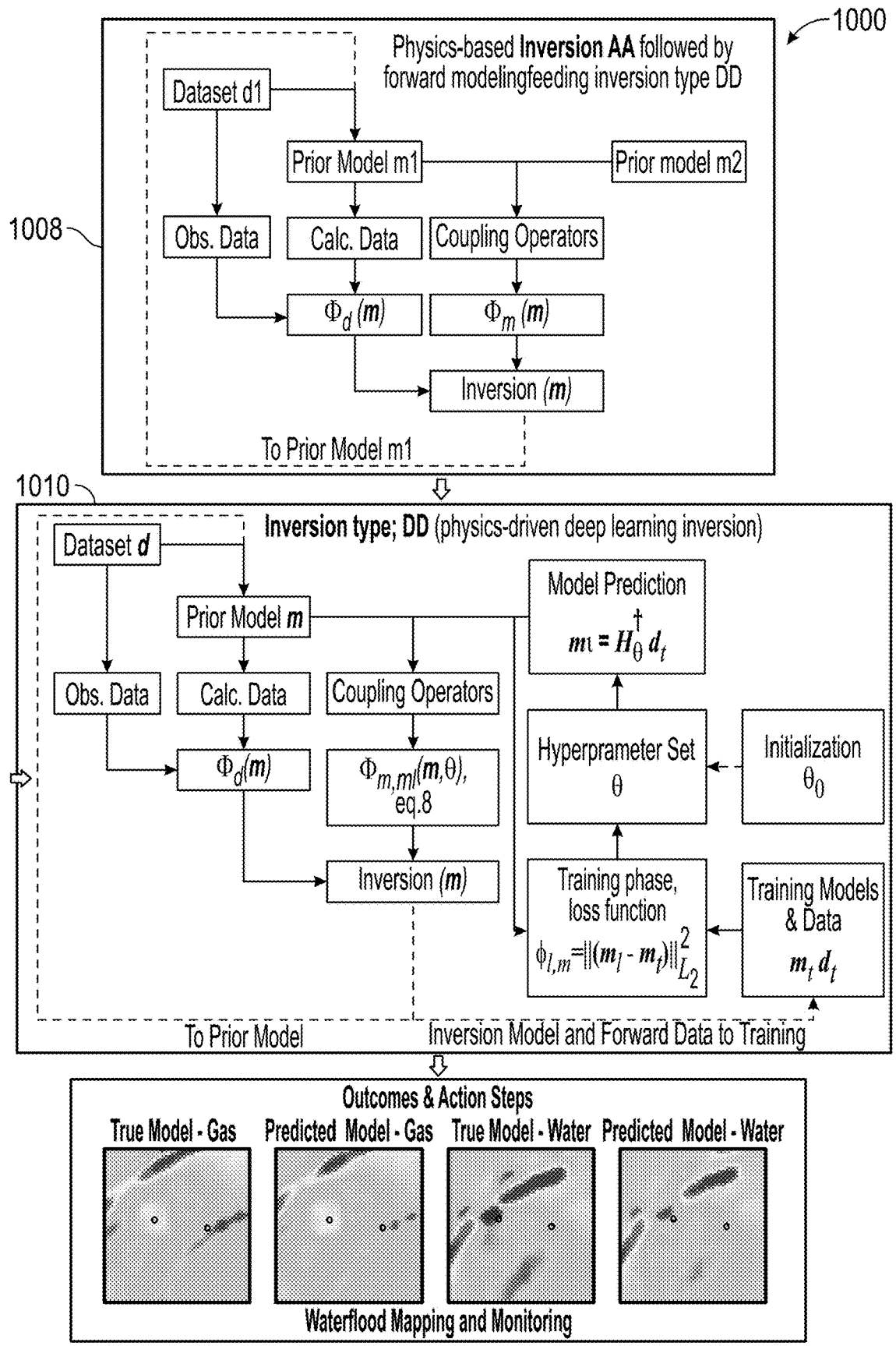

Turning to FIG. 10, FIG. 10 shows an example (1000) of the physics-driven deep learning inversion workflow as applied to the inversion of a synthetic case of cross-well EM monitoring applied to a WAG (water-alternating-gas) EOR realistic simulation in accordance with one or more embodiments.

In some embodiments, the fluid saturations in the reservoir are obtained using a reservoir simulator in which reservoir saturation snapshots are taken at regular time intervals over a period of 10 years. Saturations are then converted into the resistivity parameter using an accurate porosity model and other parameters characteristic of the reservoir.

Acquisition (1002): Crosswell EM consists of transmitting EM signal with variable frequency across two wells where in one well sources are positioned and in the second well EM receivers are recording the transmitted signals. The positioning of sources and receivers is by means of a wireline setup. Schematically, the signals travels from the source to the receivers exploring the interwell space in between the two wells. The physics of the problem consists of induction phenomena where a primary field is converted into Eddy currents circulating in the formations whose time decay further generate secondary magnetic fields measured by the receiver setup. The method works in the frequency domain and as such, the resistivity structure in between the wells is inferred from the distortions/attenuation of the signal at specific frequencies of transmission. Modifications of this basic setup are possible by using electric dipoles as source and receivers.

The acquisition setup consists of a crosswell EM experiment with two vertical wells (1002) in which the well on the left is the injector and contains the sources, whereas the well on the right is the observation well containing the receiver array. The separation between the two wells is 120 m. The source is represented by a vertical current dipole (Jz) of unit moment with vertical sampling of 1.0 m and a transmitted frequency of 1000 Hz. The receiving setup consists of a 4C sensor array comprising one vertical electric (Ez) and 3C magnetic sensors (Hx, Hy, and Hz). The background color represent resistivity-converted saturations from the fluid flow simulator.

Data representation (1004): Data are represented by the 4C sensor array comprising one vertical electric (Ez) and 3C magnetic sensors (Hx, Hy, and Hz; or Hxyz). For each fluid flow simulation realization, the simulator pillar grid is upscaled into an adaptive 3D finite-difference (FD) mesh and calculate the corresponding EM fields using a 3D FD method. Models and data are differentiated relative to the baseline to focus the attention on the time-lapse changes in resistivity and signal strength. Electric and magnetic responses are concisely represented for each simulated model by plotting amplitude and phase as a function of source (x-axis) and receiver (y-axis) positions. The specific data representation is used to facilitate the task of convolutional neural networks (CNN) of our deep learning scheme. No other specific data pre-processing is performed except differentiation of the resistivity and the EM fields relative to a baseline.

Deep learning inversion (type CC) (1006): Turning to FIG. 10 and to "Deep Learning/Neural Network" (1006), an inversion type CC is implemented where the deep learning network is first trained with simulation models from the reservoir simulator and the corresponding data responses of Ez, Hxyz on a partition of the simulation dataset (for example, 80%) that is used for training and network parameter refinement purposes (validation). The training dataset portion is only used for building the network parameters, and the validation dataset is used to further refine the network parameters. Once the network parameters have been optimized the deep learning network is used to predict the resistivity parameter distribution (model) from observed data (Ez, Hxyz). A specific type of DL network called U-Net is displayed, while the operation performed in terms of flowchart is shown by FIG. 5 (Inversion type CC). It is understood that other types of DL/ML networks may be used. The predicted models are fed into inversion type DD.

Physics-based inversion (type AA) (1008): In the "Physics-based inversion block" (type AA) of FIG. 10, how the cross-well EM data (e.g. amplitude and phase of Ez, Hxyz) is inverted using a typical linearized optimization method based on an initial model (dataset d1/m1) is described. The prior model m1 (FIG. 3A and FIG. 10) may be a simple half-space (such as used in FIG. 9B) or can be a more evolved and structured initial guess. For example, the output or prediction from the deep learning inversion (type CC) (1006) may be used as prior model m1. Inversion type AA (1008) also enables the use of a different prior model m2 that can be utilized during the optimization process by means of some penalty functions generically called "coupling operators" (for example, reference model, covariance matrix, gradient-based structure mechanisms, rock-physics, etc.). Such prior model m2 can also be the output of the deep learning prediction (type CC). The result of the physics-based inversion AA (1008) are a set of resistivity models that together their respective forward response calculation are feeding inversion type DD (1010).

Physics-driven deep learning inversion (type DD) (1010): Turning to FIG. 10 and to "Inversion type: DD (physics-driven deep learning inversion)" (1012), one specific implementation of inversion type DD is explained as an example (1100) in FIG. 11.

Figure 11:
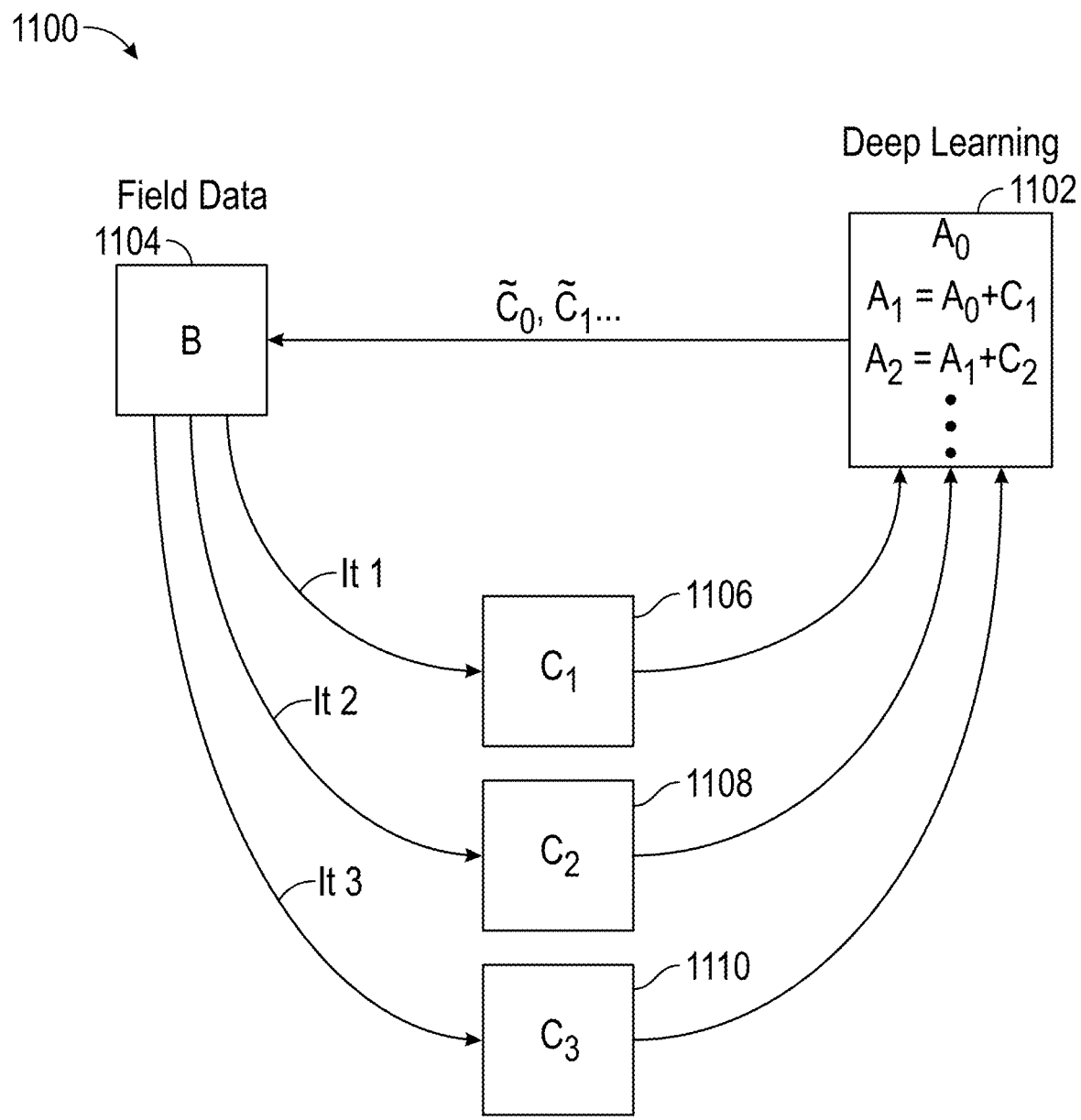
FIG. 11 shows an example in accordance with one or more embodiments.

FIG. 11 shows three groups of data: A, B, C in accordance with one or more embodiments. Data group A represents the deep learning portion where the model space and associated responses are sampled by performing extended fluid flow simulations through time: for example, 10 years of simulations with a total of 194 simulated fluid models and associated EM responses. At iteration zero, the deep learning network (1102) (after internal training and validation steps) outputs a first prediction of models based on the field data B (1104): ~C0 (inversion type CC—deep learning).

Data group B (1104) represents the "field data" or in other words the actual EM data responses for the cross-well EM configuration measured and that are mapped into one or multiple model parameter distributions (i.e. inversion process). Data group B does not change during the iterations, as this is the actual dataset that is collected.

Data group C represents the output of the inversion procedure DD at each iteration, hence C1 (1106), C2 (1108), C3 (1110), . . . , Ci. Group C is composed by models and corresponding forward responses.

In one or more embodiments, the first prediction from deep learning (~C0) is used in the inversion type AA as prior models (m1, m2 or both: m1=m2). This, through a set of penalty functions generically called "coupling operators" is biasing the inversion of datasets d1. The output of this inversion process represents a first prediction from a physics-driven inversion process type AA biased by inversion process CC, which forms inversion process DD.

After the output of C1 models (parameter distributions) at iteration 1, new forward responses are calculated and the combined model+responses C1 are fed into the deep learning (1102) re-training. Now, the training set for deep learning will be A1=A0+C1 and the new prediction will be ~C1. The process is then repeated over various iterations to observe the output of inversion type AA (i.e. C2, C3, etc.) as it becomes progressively closer to inversion type CC predictions (i.e. ~C1, ~C2, etc.). The described workflow is called inversion type DD.

In some embodiments, a stopping criterion is set by comparing Ci output to ~Cj prediction. When the two are within some statistical measure threshold it means that the procedure has converged and the output model parameter distribution is "optimal" satisfying at the same time a surrogate of a stochastic sampling of the model space (inversion type CC—data group A) and the deterministic optimization (AA—data group B). This makes the inversion results have better chances than proceeding with independent inversions such as AA or CC.

Referring back to FIG. 11, the outcome of the operation is a high-resolution resistivity model expressing the saturations in the reservoir because of oil production operations. Such a knowledge allows taking better decisions for optimizing oil production and for deciding where to drill infill wells to better drain the oil in the reservoir. The example provided is tailored for the case of cross-well EM but the same workflow can be extended to seismic or other geophysical method with acquisition from the surface, in the borehole and connecting the surface with the borehole.

Figure 12:
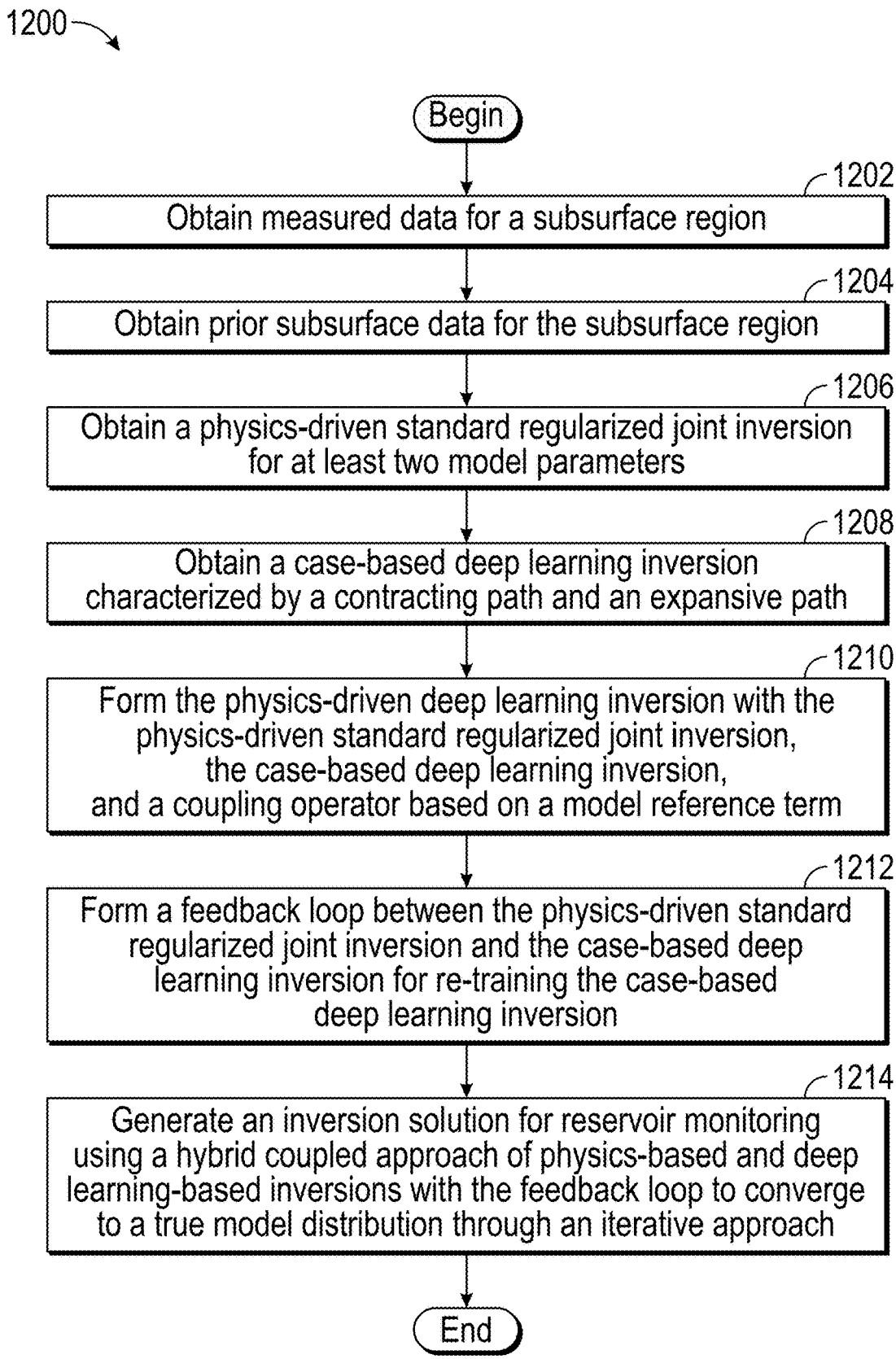
FIG. 12 shows a flowchart in accordance with one or more embodiments.

FIG. 12 shows a flowchart (1200) in accordance with one or more embodiments. Specifically, FIG. 12 describes a general method for a physics-driven deep learning-based inversion coupled to fluid flow simulators. One or more steps in FIG. 12 may be performed by one or more components (for example, reservoir simulator (160)) as described in FIGS. 1, 2A, and 2B. While the various steps in FIG. 12 are presented and described sequentially, one of ordinary skill in the art will appreciate that some or all of the steps may be executed in different orders, may be combined or omitted, and some or all of the steps may be executed in parallel. Furthermore, the steps may be performed actively or passively. The method may be repeated or expanded to support multiple components and/or multiple users within a field environment. Accordingly, the scope of the disclosed technology should not be considered limited to the specific arrangement of steps shown in FIG. 12.

In step 1202, acquired measured data is obtained for a subsurface region in accordance with one or more embodiments. For example, the acquired well data may correspond to well logs obtained for an interval of interest using a logging system (112) or logging tools (113) described previously in FIG. 1 and the accompanying description. Remote sensing techniques such as geophysical methods (e.g., seismic, gravity, electromagnetics) rely on the measurement of "fields" (e.g., travel-time/amplitudes, gravity acceleration, electric/magnetic fields) from "remote" locations such as the subsurface structures or other boreholes. For example, during a seismic survey, one or more seismic sources generate seismic energy (for example, a controlled explosion, or "shot") which is delivered into the earth. Seismic waves are reflected from subsurface structures and are received by a number of seismic sensors or "receivers" (e.g., geophones). The seismic data received by the seismic sensors is processed in an effort to create an accurate mapping of the subsurface region. The processed data is then examined (for example, analysis of images from the mapping) with a goal of identifying subsurface structures that may contain hydrocarbons. The seismic data further provide the knowledge of the relations between rock properties (e.g., P-velocity/S-velocity, density, resistivity, porosity, saturations, etc.) and corresponding measured fields given certain conditions (e.g., geometry of acquisition, other rock properties, etc.).

In step 1204, prior subsurface data is obtained for the subsurface region in accordance with one or more embodiments. For example, the fluid saturations in the reservoir are obtained through the use of the reservoir simulator (160) in which reservoir saturation snapshots are taken at regular time intervals over a period of 10 or more number of years. Saturations are then converted into the resistivity parameter using an accurate porosity model and other parameters characteristic of the reservoir for the subsurface region.

In step 1206, a physics-driven standard regularized joint inversion for at least two model parameters (for example, the physics-driven standard regularized joint inversion (350)) is obtained in accordance with one or more embodiments. However, the general scheme can be equally formulated for a case of the inversion of a single model parameter (300) or for the case of joint inversion (350) of multiple parameters described previously in FIGS. 3A-3B and the accompanying description.

In step 1208, a case-based deep learning inversion characterized by a contracting path and an expansive path (for example, the case-based deep learning inversion (500)) in accordance with one or more embodiments. For example, the case-based deep learning inversion is composed by two steps consisting of a training phase where the network hyperparameters are learned from input data and models, and a testing phase (prediction) where the optimized pseudoinverse operator is used to predict the models using observed data described previously in FIGS. 4-5 and the accompanying description. However other types of convolutional neural networks or other machine learning methods can also be implemented to apply the described workflow In step 1210, the physics-driven deep learning inversion is formed in accordance with one or more embodiments. For example, the physics-driven deep learning inversion (600) is formed with the physics-driven standard regularized joint inversion, the case-based deep learning inversion, and a coupling operator based on a model reference term described previously in FIG. 6 and the accompanying description. The model reference term is acting as a coupling operator where the structure and rock-physics operators of equation 1 are now implicitly learned through the deep learning neural network and may not need to appear as separate terms in the case-based deep learning joint inversion objective function (equation 7). The method for physics-driven deep learning inversion can be equally applied to single domain inversion (for example, single data-single parameter) as well as to multiple domain inversion (for example, multiple data-multiple parameter, or joint inversion).

In step 1212, a feedback loop between the physics-driven standard regularized joint inversion and the case-based deep learning inversion is formed in accordance with one or more embodiments. For example, the feedback loop (610) of the physics-driven deep learning inversion (600) is formed for re-training the case-based deep learning inversion. The output of the case-based deep learning inversion (for example, inversion model and corresponding forward modeled data) are added to the training dataset for further re-training of the network. The results of the inversion are also sent to update the prior model of the physics-driven standard regularized joint inversion described previously in FIG. 11 and the accompanying description.

In step 1214, an inversion solution for reservoir monitoring is generated in accordance with one or more embodiments. For example, the inverse solution (for example outcomes and action steps (1012) generated using a hybrid coupled approach of physics-based and deep learning-based inversions (1010) with the feedback loop to converge to a true model distribution through an iterative approach described previously in FIG. 10 and the accompanying description. In one or more embodiments, the workflow enables to perform high resolution mapping and monitoring of saturations in the reservoir by coupling the response of resistivity generated from a fluid flow simulator with geophysical measurements. The fluid flow simulator, being a forward process, is conditioned by the initial assumptions made. The introduction of geophysical measurements and deep learning techniques with network re-training allows to enhance the estimates and incorporate cases that deviate from the original assumptions. The outcomes of such a procedure are a better reservoir monitoring enhancing reservoir management operations, hence more oil production with less costs and reduced risks of drilling wells not finding oil (i.e. finding water instead).

The approaches described are just examples of practical implementations of the developed methodology in specific cases related to geophysical inverse problems or in other words the group of methods designed to reconstruct parameter distributions from observations of measurable data that are typically described by non-linear functions of the model parameters. It is well understood that the flowchart discussed in FIG. 12 is equally applicable to single-parameter inversion as well as to multiple-parameter coupled inversion (joint inversion).

One final consideration is that the example provided for the geophysical cases described represents only a fraction of the possible applications in the geophysical domain. The applications of the developed methodology to the whole geophysical domain represent a fraction of the applications that can be performed for all the other science, engineering, finance, medical, etc. fields.

Figure 13A:
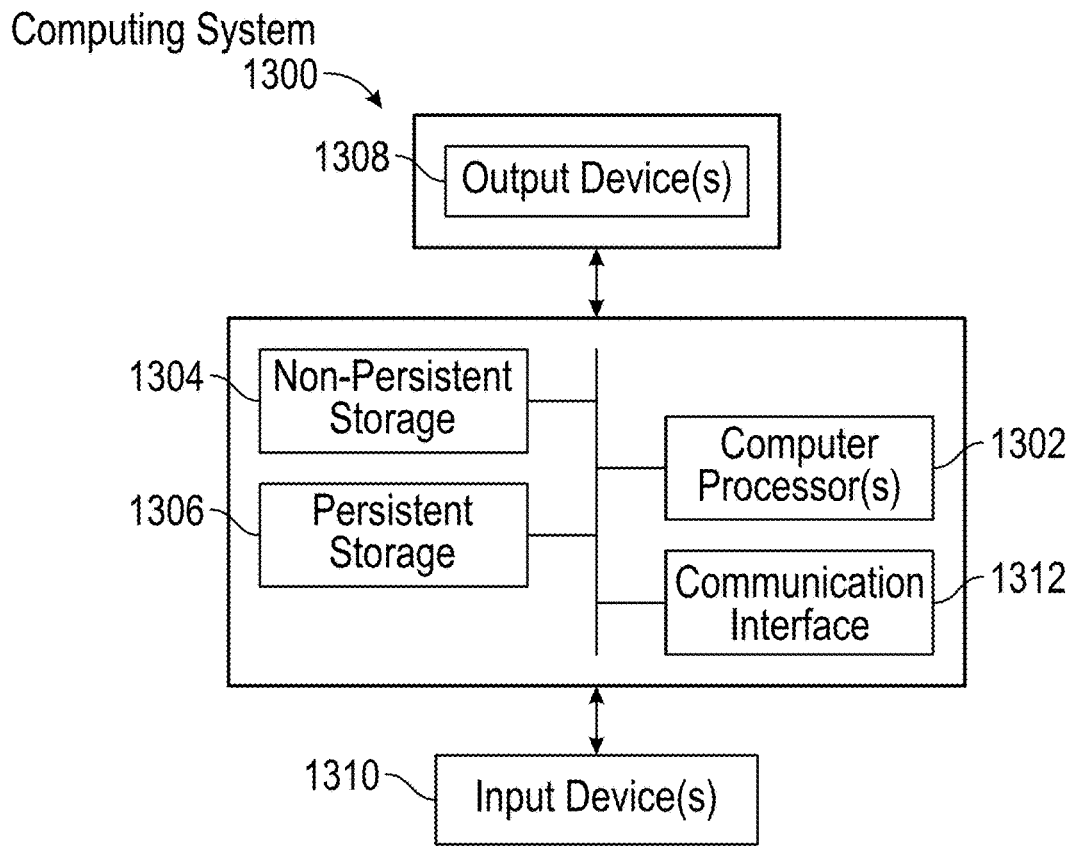
FIGS. 13A and 13B show a computing system in accordance with one or more embodiments.

Embodiments may be implemented on a computing system. Any combination of mobile, desktop, server, router, switch, embedded device, or other types of hardware may be used. For example, as shown in FIG. 13A, the computing system (1300) may include one or more computer processors (1302), non-persistent storage (1304) (for example, volatile memory, such as random access memory (RAM), cache memory), persistent storage (1306) (for example, a hard disk, an optical drive such as a compact disk (CD) drive or digital versatile disk (DVD) drive, a flash memory), a communication interface (1312) (for example, Bluetooth interface, infrared interface, network interface, optical interface), and numerous other elements and functionalities.

The computer processor(s) (1302) may be an integrated circuit for processing instructions. For example, the computer processor(s) may be one or more cores or micro-cores of a processor. The computing system (1300) may also include one or more input devices (1310), such as a touchscreen, keyboard, mouse, microphone, touchpad, or electronic pen.

The communication interface (1312) may include an integrated circuit for connecting the computing system (1300) to a network (not shown) (for example, a local area network (LAN), a wide area network (WAN), such as the Internet, mobile network, or any other type of network) or to another device, such as another computing device.

Further, the computing system (1300) may include one or more output devices (1308), such as a screen (for example, a liquid crystal display (LCD), a plasma display, touchscreen, cathode ray tube (CRT) monitor, or projector), a printer, external storage, or any other output device. One or more of the output devices may be the same or different from the input device(s). The input and output device(s) may be locally or remotely connected to the computer processor(s) (1302), non-persistent storage (1304), and persistent storage (1306). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s) is configured to perform one or more embodiments of the disclosure.

Figure 13B:
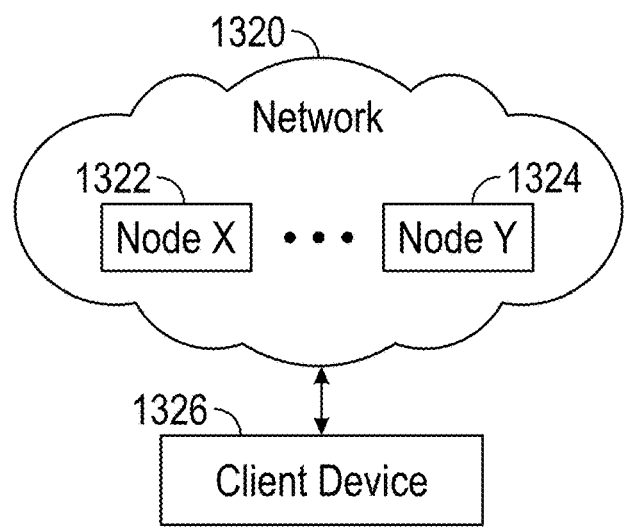

The computing system (1300) in FIG. 13A may be connected to or be a part of a network. For example, as shown in FIG. 13B, the network (1320) may include multiple nodes (for example, node X (1322), node Y (1324)). Each node may correspond to a computing system, such as the computing system shown in FIG. 13A, or a group of nodes combined may correspond to the computing system shown in FIG. 13A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (1300) may be located at a remote location and connected to the other elements over a network.

Although not shown in FIG. 13B, the node may correspond to a blade in a server chassis that is connected to other nodes via a backplane. By way of another example, the node may correspond to a server in a data center. By way of another example, the node may correspond to a computer processor or micro-core of a computer processor with shared memory or resources.

The nodes (for example, node X (1322), node Y (1324)) in the network (1320) may be configured to provide services for a client device (1326). For example, the nodes may be part of a cloud computing system. The nodes may include functionality to receive requests from the client device (1326) and transmit responses to the client device (1326). The client device (1326) may be a computing system, such as the computing system shown in FIG. 13A. Further, the client device (1326) may include or perform all or a portion of one or more embodiments of the disclosure.

The computing system or group of computing systems described in FIGS. 13A and 13B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided in subsequent paragraphs.

Based on the client-server networking model, sockets may serve as interfaces or communication channel endpoints enabling bidirectional data transfer between processes on the same device. Foremost, following the client-server networking model, a server process (for example, a process that provides data) may create a first socket object. Next, the server process binds the first socket object, thereby associating the first socket object with a unique name or address. After creating and binding the first socket object, the server process then waits and listens for incoming connection requests from one or more client processes (for example, processes that seek data). At this point, when a client process wishes to obtain data from a server process, the client process starts by creating a second socket object. The client process then proceeds to generate a connection request that includes at least the second socket object and the unique name or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (for example, bytes).

Shared memory refers to the allocation of virtual memory space in order to substantiate a mechanism for which data may be communicated or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the selection by the user.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the selection by the user. Further to the above example, the data received from the server after selecting the URL link may provide a web page in Hyper Text Markup Language (HTML) that may be rendered by the web client and displayed on the user device.

Once data is obtained, such as by using techniques described previously or from storage, the computing system, in performing one or more embodiments of the disclosure, may extract one or more data items from the obtained data. For example, the extraction may be performed as follows by the computing system (1300) in FIG. 13A. First, the organizing pattern (for example, grammar, schema, layout) of the data is determined, which may be based on one or more of the following: position (for example, bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 13A, while performing one or more embodiments of the disclosure, may perform data comparison. Data comparison may be used to compare two or more data values (for example, A, B). For example, one or more embodiments may determine whether A>B, A=B, A!=B, A<B, etc. The comparison may be performed by submitting A, B, and an opcode specifying an operation related to the comparison into an arithmetic logic unit (ALU) (that is, circuitry that performs arithmetic or bitwise logical operations on the two data values). The ALU outputs the numerical result of the operation or one or more status flags related to the numerical result. For example, the status flags may indicate whether the numerical result is a positive number, a negative number or zero. By selecting the proper opcode and then reading the numerical results or status flags, the comparison may be executed. For example, in order to determine if A>B, B may be subtracted from A (that is, A−B), and the status flags may be read to determine if the result is positive (that is, if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 13A may implement or be connected to a data repository. For example, one type of data repository is a database. A database is a collection of information configured for ease of data retrieval, modification, re-organization, and deletion. Database management system (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (for example, join, full join, count, average), sort (for example, ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 13A may include functionality to present raw or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, for example, data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, for example, by obtaining data from a data attribute within the data object that identifies the data object type. Then, the GUI may determine any rules designated for displaying that data object type, for example, rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The previous description of functions presents only a few examples of functions performed by the computing system of FIG. 13A and the nodes or client device in FIG. 13B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed. Accordingly, the scope of the disclosure should be limited only by the attached claims.

What is claimed:

1. A method for a physics-driven deep learning-based inversion coupled to fluid flow simulators, comprising:
    obtaining, with a Magnetic Resonance (MR) scanner or a pulse Nuclear Magnetic Resonance (NMR) logging tool configured to generate a magnetic field and measure a presence of protons in the magnetic field, measured data for a subsurface region, wherein the measured data includes MR data and NMR data;
    obtaining, by a computer processor, prior subsurface data for the subsurface region;
    obtaining, by the computer processor, a physics-driven standard regularized joint inversion for at least two model parameters;
    obtaining, by the computer processor, a case-based deep learning inversion characterized by a contracting path and an expansive path, wherein the case-based deep learning inversion includes a training phase where network hyperparameters are learned from the MR data, the NMR data, and the prior subsurface data and the case-based deep learning inversion includes a testing phase where an optimized pseudoinverse operator is used to predict resistivity measurements;
    forming, by the computer processor, the physics-driven deep learning inversion with the physics-driven standard regularized joint inversion, the case-based deep learning inversion, and a rock-physics coupling operator based on a penalty function;
    forming, by the computer processor, a feedback loop between the physics-driven standard regularized joint inversion and the case-based deep learning inversion for re-training the case-based deep learning inversion;
    generating an inversion solution for reservoir monitoring, by the computer processor, using a hybrid coupled approach of physics-based and deep learning-based inversions with the feedback loop to converge to a true model distribution through an iterative approach;
    guiding, with a geosteering system, a drill bit based upon the resistivity measurements or acoustic measurements;
    adjusting the geosteering system using the inversion solution based on the contracting path and the expansive path, and steering, by the computer processor, the drill bit based on monitoring, in real time, a detected sensor signature proximate the drill bit, wherein when the resistivity measurements are employed, an upper boundary and a lower boundary of the subsurface region are computed from geological models using inversion techniques, wherein when the acoustic measurements are employed, the upper boundary and the lower boundary of the subsurface region are calculated based on a travelling time of reflected sonic waves and a corresponding sonic velocity of formation rocks, and wherein the monitoring comprises comparing the detected sensor signature to a known cap rock sensor signature, a known pay zone sensor signature, and a known bed rock sensor signature.

2. The method of claim 1, wherein the physics-driven deep learning inversion is valid for:
a single domain inversion with a single data and a single model parameter, and
multiple-domain inversion with multiple data and multiple model parameters.

3. The method of claim 1, further comprising:
adding, by the computer processor, an output of the case-based deep learning inversion to a training dataset for further re-training of the case-based deep learning inversion via the feedback loop; and
updating, by the computer processor, a prior model of the physics-driven standard regularized joint inversion using a result of the case-based deep learning inversion.

4. The method of claim 1, further comprising:
reducing dependency to a starting model of the physics-driven deep learning inversion by using a weighted coupling operator to be used on the penalty function directly obtained from the case-based deep learning inversion.

5. The method of claim 1, wherein the physics-driven standard regularized joint inversion is based on a linear algebra.

6. The method of claim 1, wherein an objective function of the physics-driven deep learning inversion is a composite objective function based on a standard physics-based forward model with other regularization terms including the penalty function between the physics-driven standard regularized joint inversion and the case-based deep learning inversion.

7. The method of claim 1, wherein the case-based deep learning inversion is composed by two steps consisting of:
a training phase learning from a plurality of input data and a plurality of models, and
a testing phase predicting the plurality of models using observed data.

8. A system, comprising:
a drilling system;
a logging system comprising a plurality of drill bit logging tools, wherein the logging system is coupled to the drilling system;
a control system coupled to a plurality of sensors; and
a reservoir simulator comprising a computer processor, wherein the reservoir simulator is coupled to the logging system and the drilling system and comprises functionality for:
obtaining, with a Magnetic Resonance (MR) scanner or a pulse Nuclear Magnetic Resonance (NMR) logging tool configured to generate a magnetic field and measure a presence of protons in the magnetic field, measured data for a subsurface region, wherein the measured data includes MR data and NMR data;
obtaining, by the computer processor, prior subsurface data for the subsurface region;
obtaining, by the computer processor, a physics-driven standard regularized joint inversion for at least two model parameters;
obtaining, by the computer processor, a case-based deep learning inversion characterized by a contracting path and an expansive path, wherein the case-based deep learning inversion includes a training phase where network hyperparameters are learned from the MR data, the NMR data, and the prior subsurface data and the case-based deep learning inversion includes a testing phase where an optimized pseudoinverse operator is used to predict resistivity measurements;
forming, by the computer processor, the physics-driven deep learning inversion with the physics-driven standard regularized joint inversion, the case-based deep learning inversion, and a rock-physics coupling operator based on a penalty function;
forming, by the computer processor, a feedback loop between the physics-driven standard regularized joint inversion and the case-based deep learning inversion for re-training the case-based deep learning inversion;
generating an inversion solution for reservoir monitoring, by the computer processor, using a hybrid coupled approach of physics-based and deep learning-based inversions with the feedback loop to converge to a true model distribution through an iterative approach;
guiding, with a geosteering system, a drill bit based upon the resistivity measurements or acoustic measurements;
adjusting the geosteering system using the inversion solution based on the contracting path and the expansive path, and
steering, by the computer processor, the drill bit based on monitoring, in real time, a detected sensor signature proximate the drill bit,
wherein when the resistivity measurements are employed, an upper boundary and a lower boundary of the subsurface region are computed from geological models using inversion techniques,
wherein when the acoustic measurements are employed, the upper boundary and the lower boundary of the subsurface region are calculated based on a travelling time of reflected sonic waves and a corresponding sonic velocity of formation rocks, and
wherein the monitoring comprises comparing the detected sensor signature to a known cap rock sensor signature, a known pay zone sensor signature, and a known bed rock sensor signature.

9. The system of claim 8, wherein the physics-driven deep learning inversion is valid for:
a single domain inversion with a single data and a single model parameter, and
multiple-domain inversion with multiple data and multiple model parameters.

10. The system of claim 8, wherein the reservoir simulator is configured to:
add an output of the case-based deep learning inversion to a training dataset for further re-training of the case-based deep learning inversion via the feedback loop; and update a prior model of the physics-driven standard regularized joint inversion using a result of the case-based deep learning inversion.

11. The system of claim 8, wherein the reservoir simulator is configured to:
reduce dependency to a starting model of the physics-driven deep learning inversion by using a weighted coupling operator to be used on the penalty function directly obtained from the case-based deep learning inversion.

12. The system of claim 8, wherein the physics-driven standard regularized joint inversion is based on a linear algebra.

13. The system of claim 8, wherein an objective function of the physics-driven deep learning inversion is a composite objective function based on a standard physics-based forward model with other regularization terms including the penalty function between the physics-driven standard regularized joint inversion and the case-based deep learning inversion.

14. The system of claim 8, wherein the case-based deep learning inversion is composed by two steps consisting of:
a training phase learning from a plurality of input data and a plurality of models, and
a testing phase predicting the plurality of models using observed data.

15. A non-transitory computer readable medium storing instructions executable by a computer processor, the instructions comprising functionality for:
obtaining, with a Magnetic Resonance (MR) scanner or a pulse Nuclear Magnetic Resonance (NMR) logging tool configured to generate a magnetic field and measure a presence of protons in the magnetic field, measured data for a subsurface region, wherein the measured data includes MR data and NMR data;
obtaining prior subsurface data for the subsurface region;
obtaining a physics-driven standard regularized joint inversion for at least two model parameters;
obtaining a case-based deep learning inversion characterized by a contracting path and an expansive path, wherein the case-based deep learning inversion includes a training phase where network hyperparameters are learned from the MR data, the NMR data, and the prior subsurface data and the case-based deep learning inversion includes a testing phase where an optimized pseudoinverse operator is used to predict resistivity measurements;
forming the physics-driven deep learning inversion with the physics-driven standard regularized joint inversion, the case-based deep learning inversion, and a rock-physics coupling operator based on a penalty function;
forming a feedback loop between the physics-driven standard regularized joint inversion and the case-based deep learning inversion for re-training the case-based deep learning inversion;
generating an inversion solution for reservoir monitoring using a hybrid coupled approach of physics-based and deep learning-based inversions with the feedback loop to converge to a true model distribution through an iterative approach;
guiding, with a geosteering system, a drill bit based upon the resistivity measurements or acoustic measurements;
adjusting the geosteering system using the inversion solution based on the contracting path and the expansive path, and
steering the drill bit based on monitoring, in real time, a detected sensor signature proximate the drill bit,
wherein when the resistivity measurements are employed, an upper boundary and a lower boundary of the subsurface region are computed from geological models using inversion techniques,
wherein when the acoustic measurements are employed, the upper boundary and the lower boundary of the subsurface region are calculated based on a travelling time of reflected sonic waves and a corresponding sonic velocity of formation rocks, and
wherein the monitoring comprises comparing the detected sensor signature to a known cap rock sensor signature, a known pay zone sensor signature, and a known bed rock sensor signature.

16. The non-transitory computer readable medium of claim 15, wherein the physics-driven deep learning inversion is valid for:
a single domain inversion with a single data and a single model parameter, and
multiple-domain inversion with multiple data and multiple model parameters.

17. The non-transitory computer readable medium of claim 15, wherein the instructions further comprise functionality for:
adding an output of the case-based deep learning inversion to a training dataset for further re-training of the case-based deep learning inversion via the feedback loop; and
updating a prior model of the physics-driven standard regularized joint inversion using a result of the case-based deep learning inversion.

18. The non-transitory computer readable medium of claim 15, wherein the instructions further comprise functionality for:
reducing dependency to a starting model of the physics-driven deep learning inversion by using a weighted coupling operator to be used on the penalty function directly obtained from the case-based deep learning inversion.

19. The non-transitory computer readable medium of claim 15, wherein the physics-driven standard regularized joint inversion is based on a linear algebra.

20. The non-transitory computer readable medium of claim 15, wherein an objective function of the physics-driven deep learning inversion is a composite objective function based on a standard physics-based forward model with other regularization terms including the penalty function between the physics-driven standard regularized joint inversion and the case-based deep learning inversion.

* * * * *